United States Patent
Woo et al.

(10) Patent No.: US 10,692,495 B2
(45) Date of Patent: Jun. 23, 2020

(54) METHOD OF RECEIVING COMMANDS FOR ACTIVATING VOICE-RECOGNITION SERVICE AND ELECTRONIC DEVICE FOR IMPLEMENTING SAME

(71) Applicant: Samsung Electronics Co., Ltd., Gyeonggi-do (KR)

(72) Inventors: Kwang-Taek Woo, Daegu (KR); Kwan-Shik Park, Gyeongsangbuk-do (KR); Chang-Hoon Shin, Gyeongsangbuk-do (KR); Ki-Seok Kim, Gyeongsangbuk-do (KR); Jin-Wan An, Daegu (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/113,602

(22) Filed: Aug. 27, 2018

(65) Prior Publication Data

US 2019/0066680 A1 Feb. 28, 2019

(30) Foreign Application Priority Data

Aug. 25, 2017 (KR) .................. 10-2017-0107963

(51) Int. Cl.
*G10L 15/26* (2006.01)
*G10L 15/22* (2006.01)
(Continued)

(52) U.S. Cl.
CPC .............. *G10L 15/22* (2013.01); *G10L 15/08* (2013.01); *G10L 15/30* (2013.01); *G10L 2015/088* (2013.01); *G10L 2015/223* (2013.01)

(58) Field of Classification Search
CPC ......... G10L 15/08; G10L 15/22; G10L 15/30; G10L 2015/088; G10L 2015/223; G10L 2015/225
See application file for complete search history.

(56) References Cited

U.S. PATENT DOCUMENTS 8,666,751 B2 * 3/2014 Murthi .................. G06F 1/3234
704/275
8,924,219 B1 12/2014 Bringert et al.
(Continued)

FOREIGN PATENT DOCUMENTS

KR 1020060007148 1/2006
KR 1020120010035 2/2012
(Continued)

OTHER PUBLICATIONS

International Search Report dated Dec. 4, 2018 issued in counterpart application No. PCT/KR2018/009821, 11 pages.
(Continued)

*Primary Examiner* — Satwant K Singh
(74) *Attorney, Agent, or Firm* — The Farrell Law Firm, P.C.

(57) ABSTRACT

An electronic device is provided. The electronic device includes at least one processor and a memory electrically connected to the processor. The memory stores instructions, and the instructions are configured to cause the processor, when executed, to activate a voice recognition service in response receiving a specified user input, receive a voice command while activating the voice recognition service, provide a feedback for the voice command, deactivate the voice recognition service after providing the feedback, receive a voice signal distinct from the specified user input while deactivating the voice recognition service, in response to receiving the voice signal, identify whether at least a portion of the voice signal corresponds to a wake-up command that is obtained from the voice command, and in response to identifying that the at least the portion of the voice signal corresponds to the wake-up command, activate the voice recognition service.

20 Claims, 14 Drawing Sheets

(51) Int. Cl.
  *G10L 15/08*  (2006.01)
  *G10L 15/30*  (2013.01)

(56) References Cited

U.S. PATENT DOCUMENTS

| | | | | |
|---|---|---|---|---|
| 9,472,196 | B1* | 10/2016 | Wang | G06F 3/167 |
| 9,542,941 | B1* | 1/2017 | Weksler | G10L 15/22 |
| 10,210,863 | B2* | 2/2019 | Garner | G10L 15/30 |
| 2008/0133244 | A1* | 6/2008 | Bodin | G10L 15/22 |
| | | | | 704/275 |
| 2011/0288859 | A1* | 11/2011 | Taylor | G10L 15/22 |
| | | | | 704/231 |
| 2013/0132095 | A1* | 5/2013 | Murthi | G06F 1/3234 |
| | | | | 704/275 |
| 2014/0195249 | A1 | 7/2014 | Chung et al. | |
| 2014/0278443 | A1* | 9/2014 | Gunn | G06F 3/0488 |
| | | | | 704/275 |
| 2015/0120299 | A1* | 4/2015 | Thomsen | G10L 15/22 |
| | | | | 704/246 |
| 2016/0293168 | A1* | 10/2016 | Chen | G10L 15/22 |
| 2017/0323642 | A1* | 11/2017 | Lindahl | G10L 15/32 |

FOREIGN PATENT DOCUMENTS

| | | |
|---|---|---|
| KR | 1020140068752 | 6/2014 |
| KR | 1020140073889 | 6/2014 |
| KR | 1020140089871 | 7/2014 |

OTHER PUBLICATIONS

European Search Report dated Jan. 22, 2019 issued in counterpart application No. 18190758.5-1210, 10 pages.
European Search Report dated Dec. 12, 2019 issued in counterpart application No. 18190758.5-1210, 5 pages.

* cited by examiner

METHOD OF RECEIVING COMMANDS FOR ACTIVATING VOICE-RECOGNITION SERVICE AND ELECTRONIC DEVICE FOR IMPLEMENTING SAME

CROSS-REFERENCE TO RELATED APPLICATION(S)

This application is based on and claims priority under 35 U.S.C. § 119 to Korean Patent Application Serial No. 10-2017-0107963, filed on Aug. 25, 2017, in the Korean Intellectual Property Office, the entire disclosure of which is incorporated herein by reference.

BACKGROUND

1. Field

The present disclosure relates, generally, to an electronic device and a method, and more particularly, to an electronic device and a method for activating a voice recognition service using a user wake word.

2. Description of Related Art

With the recent development of digital technology, various types of electronic devices, such as mobile communication terminals, personal digital assistants (PDAs), electronic organizers, smart phones, tablet personal computers (PCs), and wearable devices are widely used. The hardware parts and/or software parts of the electronic device are continually improving in order to improve support and increase functions thereof.

An artificial intelligence (AI) system is a computer system for implementing intelligence at the level of human intelligence, in which a machine learns, judges, and becomes smarter by itself, unlike the conventional rule-based smart system. With use, the AI system may improve a recognition rate and more accurately understand a user's taste, and thus the conventional rule-based smart system has been gradually replaced with a deep-learning-based AI system.

AI technology includes machine learning (deep-learning) and element technologies using machine learning.

Machine learning is algorithm technology autonomously classifying/learning features of input data, and element technology is technology simulating cognitive and judgment functions of human brains based on a machine-learning algorithm such as a deep-learning algorithm and includes technology fields such as linguistic understanding, visual understanding, inference/prediction, knowledge representation, and operation control.

Various fields to which AI technology is applied include following. Linguistic understanding is technology for recognizing and applying/processing human languages/characters and may include natural language processing, machine translation, dialogue systems, question-and-answer systems, and voice recognition/synthesis. Visual understanding is technology for recognizing and processing an object in the manner of human vision, and includes object recognition, object tracking, image searching, person recognition, scene understanding, space understanding, and image improvement. Inference/prediction is technology for determining information to logically infer and predict the same, and includes knowledge/probability-based inference, optimization prediction, preference-based plan, and recommendation. Knowledge representation is technology for automatic processing of information on human experience to obtain knowledge data, and includes knowledge construction (data creation/classification) and knowledge management (data use). Operation control is technology for controlling autonomous driving of vehicles and movement of robots, and includes movement control (navigation, collision, and driving) and manipulation control (behavior control).

An electronic device provides various services (or functions) by combining voice-recognition technology and AI technology. Voice-recognition technology may include, for example, technology for converting an acoustic speech signal acquired through a sound sensor, such as a microphone, into a word or a sentence. The voice-recognition technology may generally perform a task of removing noise after extracting an acoustic speech signal, followed by extracting features of the acoustic speech signal and comparing the extracted features with an acoustic model database (DB) so as to perform voice recognition. The electronic device may provide various living convenience services such as mobile searching, schedule management, phone call, memo taking, or music playback based on a user's voice command.

SUMMARY

The present disclosure has been made to address at least the disadvantages described above and to provide at least the advantages described below.

An aspect of the present disclosure provides an electronic device to start a voice recognition service based on a wake-up scheme. The electronic device may activate the voice recognition service when a wake word (e.g., a voice wake word), a touch, or a button for the voice recognition service is input. A voice recognition method using the wake word may provide a response according to a user's voice command by executing (or activating) the voice recognition service when a voice input through a microphone is the wake word. However, the electronic device may stop or deactivate the execution of the voice recognition service when the voice command is not received from the user before a predetermined time (e.g., 3 seconds, 5 seconds, or 10 seconds) passes after the response is provided. If re-execution of the voice recognition service is desired, the electronic device may again receive the wake word from the user and perform the voice recognition service. The wake word may be preset in the electronic device, and may be changed or configured. That is, when the user continuously attempts the voice command for a predetermined time or exceeds the predetermined time, the user may experience inconvenience in that the user can only attempt the voice command after first speaking the wake word.

According to various embodiments, it is possible to improve user's convenience by continuously providing a voice recognition service without the need to continuously make a voice command for a predetermined time or make a voice command after a predetermined wake word is spoken.

In accordance with an aspect of the present disclosure, an electronic device is provided. The electronic device includes a speaker, a microphone, a communication interface, at least one processor electrically connected to the speaker, the microphone, and the communication interface, and a memory electrically connected to the processor. The memory stores instructions, and the instructions are configured to cause the processor, when executed, to activate a voice recognition service in response receiving a specified user input, receive a voice command while activating the voice recognition service, provide a feedback for the voice command, deactivate the voice recognition service after providing the feedback, receive a voice signal distinct from the specified user input while deactivating the voice recognition service, in response to receiving the voice signal, identify whether at least a portion of the voice signal corresponds to a wake-up command that is obtained from the voice command, and in response to identifying that the at least the portion of the voice signal corresponds to the wake-up command, activate the voice recognition service.

In accordance with an aspect of the present disclosure, an electronic device is provided. The electronic device includes a speaker, a microphone, a communication interface, at least one processor electrically connected to the speaker, the microphone, and the communication interface, and a memory electrically connected to the processor. The memory stores instructions, and the instructions are configured to cause the processor, when executed, to receive at least one main wake word through the microphone, in response to the received main wake word, activate a voice recognition function provided from an external server or implemented in the electronic device, receive a user's speech including at least one user wake word through the microphone, and activate the voice recognition function in response to the received user wake word without the main wake word.

In accordance with an aspect of the present disclosure, an electronic device is provided. The electronic device includes a speaker, a microphone, a communication interface, at least one processor electrically connected to the speaker, the microphone, and the communication interface, and a memory electrically connected to the processor. The memory stores instructions, and the instructions are configured to cause the processor, when executed, to in response to receiving in a state disabling a voice recognition service, a first voice signal that is distinct from a specified user input for enabling a voice recognition service and that corresponds to a voice command that has been previously received after reception of the specified user input, enable the voice recognition service, and in response to receiving, in the state, a second voice signal that is distinct from the specified user input for enabling the voice recognition service and distinct from the voice command that has been previously received after reception of the specified user input, maintain to disable the voice recognition service.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
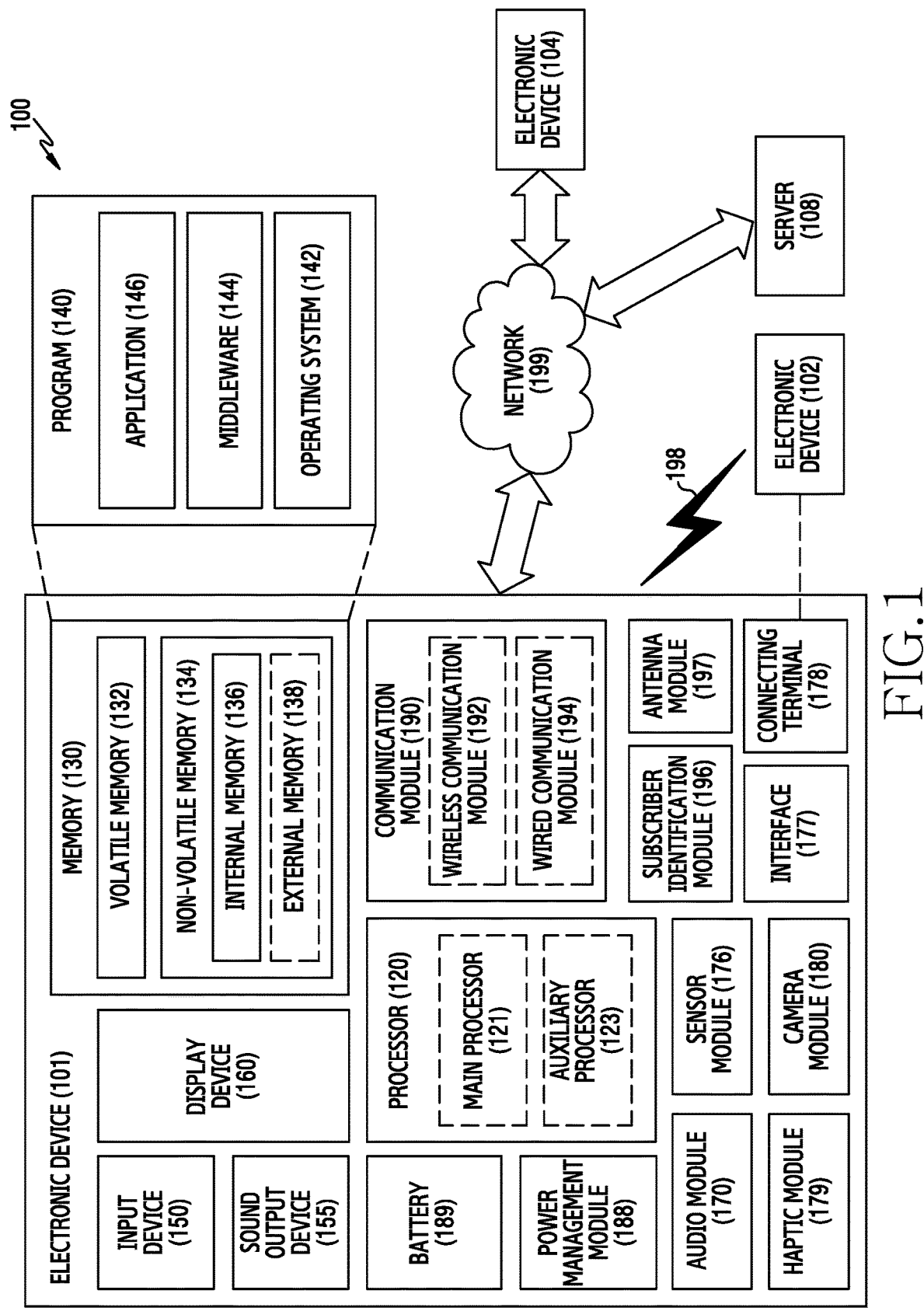
FIG. 1 is a diagram of an electronic device within a network environment, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context.

For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet PC, a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is a diagram of an electronic device 101 in a network environment 100, according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. At least one component (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., CPU or an AP), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 may be implemented as part of another component functionally related to the auxiliary processor 123.

The memory 130 may store various data used by at least one component of the electronic device 101. The various data may include software and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by other component of the electronic device 101, from the outside (e.g., a user) of the electronic device 101. The input device 150 may include a microphone, a mouse, or a keyboard.

The sound output device 155 may output sound signals to the outside of the electronic device 101. The sound output device 155 may include a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device directly (e.g., by wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device directly (e.g., by wired) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device. The connecting terminal 178 may include a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device and performing communication via the established communication channel. The communication module 190 may include one or more communication processors that are operable independently from the processor 120 (e.g., AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include one or more antennas, and, therefrom, at least one antenna appropriate for a communication scheme used in the communication network, such as the first network 198 or the second network 199, may be selected, for example, by the communication module 190. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
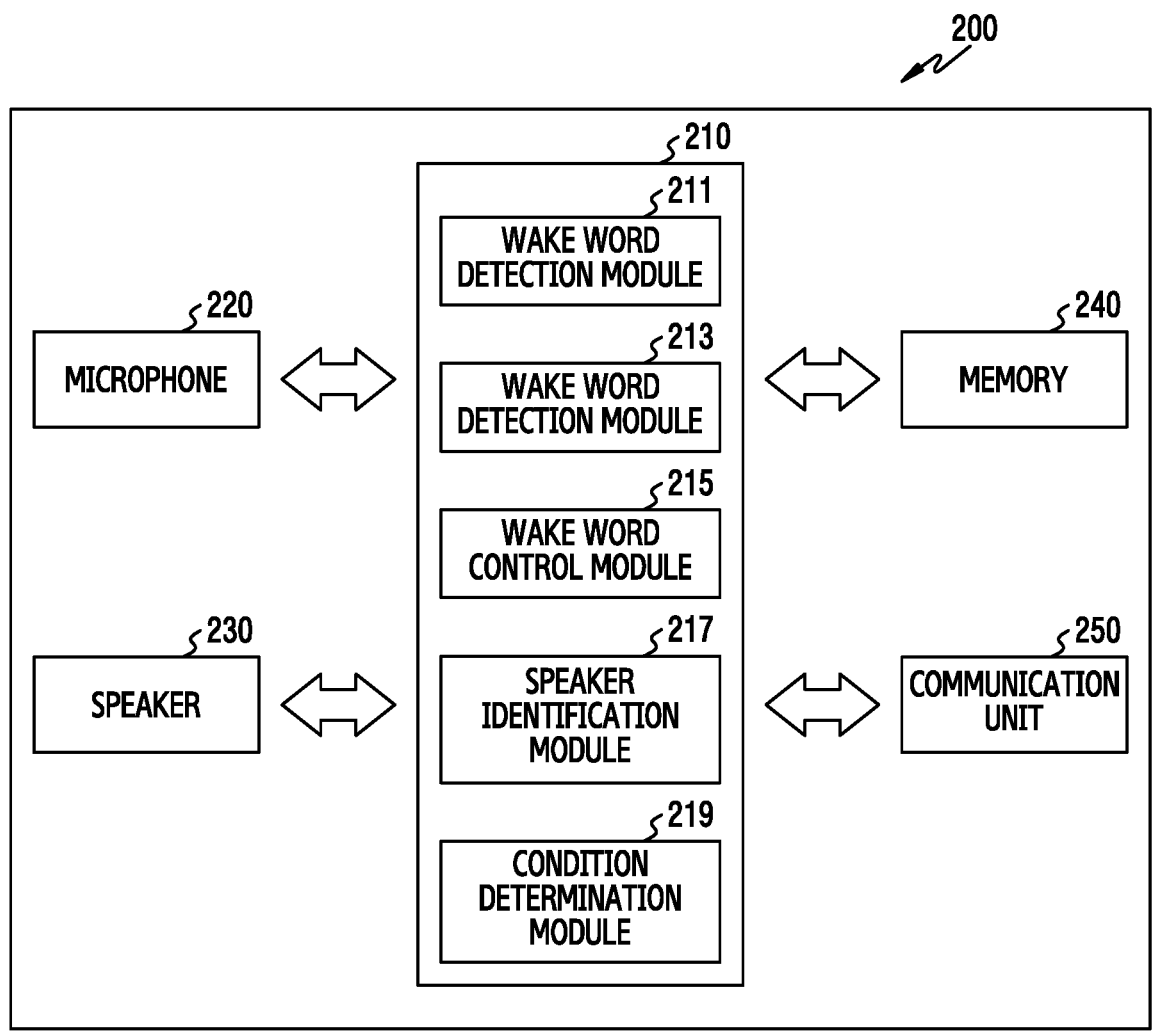
FIG. 2 is a diagram of the configuration of the electronic device, according to an embodiment.

FIG. 2 is a diagram of a configuration of the electronic device, according to an embodiment.

Referring to FIG. 2, an electronic device 200 may include a processor 210, a microphone 220, a speaker 230, a memory 240, or a communication unit 250. Since not all of the elements illustrated in FIG. 2 are necessary, the electronic device 200 may have more or fewer elements than those illustrated in FIG. 2. The electronic device 200 may be a device to which an AI system for simulating the cognitive and judgment functions of human brains is applied based on a machine-learning algorithm such as a deep-learning algorithm.

The processor 210 may detect a user input for a voice recognition service, recognize a voice by activating the voice recognition service according to the detected user input, and perform a function corresponding to the recognized voice. The user input may include at least one of a wake word, a touch, and a button. When the voice recognition service is using the voice wake word, the processor 210 may activate the voice recognition service by detecting a main wake word (or a first wake word), process a task for the voice input from the user, analyze voice information, and register at least one user wake word (or a second wake word). The processor 210 may detect a wake word using instructions stored in the memory 240 and provide a voice recognition service. The instructions may be included as a hardware module or a software module in the processor 120 having processing circuitry. The instructions may include a wake word detection module 211, a voice recognition module 213, a wake word control module 215, a speaker identification module 217, or a condition determination module 219.

The wake word detection module 211 (or a wake-up engine) may detect a wake word. The wake word may include a main wake word set in the electronic device 200 or a user wake word registered by the user. The wake word may also be referred to as a wake-up command or a wake-up word. The wake word may be stored in the memory 240. The wake word detection module 211 may determine whether a wake word is included in a voice input through the microphone 220. The wake word detection module 211 may record the voice received from the microphone 220 (for example, store the voice in a buffer.

The wake word detection module 211 may process the input sound to be a voice signal (e.g., preprocessing). The processing of the voice signal is a preprocessing process for voice recognition and may refer to conversion from a sound to a voice signal. Alternatively, the wake word detection module 211 may convert the converted voice signal to text (e.g., speech to text). The wake word detection module 211 may determine whether a wake word is included in converted text information. The wake word detection module 211 may extract text information from the input word by interworking with the voice recognition module 213. Alternatively, the wake word detection module 211 may be included in the voice recognition module 213. The wake word detection module 211 may determine whether the extracted text information matches the wake word stored in the memory 240. When a wake word is detected, the wake word detection module 211 may inform the voice recognition module 213 that the wake word is detected.

When the wake word is detected, the voice recognition module 213 may activate (or execute) the voice recognition service (or a voice recognition function). The voice recognition module 213 may serve to receive (or input) a voice (or a voice signal) from the microphone 220, together with the wake word or after detecting the wake word, and recognize the received voice (e.g., automatic speech recognition (ASR)). The voice recognition module 213 may perform language processing (e.g., natural language understanding (NLU), dialogue management (DM), or text to speech (TTS)) for the voice signal. The voice recognition module 213 may interwork with a voice-processing server for voice processing and voice recognition. The voice recognition module 213 may transmit the received (or input) voice signal (or recorded voice file) to the voice-processing server and receive voice information (or text information corresponding to the voice information) from the voice-processing server. Alternatively, the voice recognition module 213 may generate (or extract) text information by processing the received voice, transmit the generated text information to the voice-processing server, and receive task information corresponding to the text information from the voice-processing server. The task information may refer to a function (or a service) that the electronic device 200 should perform in response to a user's speech. The voice recognition module 213 may transfer at least one piece of the voice information, the text information, and the task information to the wake word control module 215, the speaker identification module 217, and the condition determination module 219.

The voice recognition module 213 may process a task based on the voice information. The voice recognition module 213 may process at least one task related to execution of a function corresponding to the voice information based on the received task information. For example, when the sentence "What's the weather like today?" is recognized according to the user's speech, the voice recognition module 213 may search for weather information corresponding to the current location or the current time of the electronic device 200 on the Internet and provide the found weather information. The weather information may include at least one of text, images, sounds, and videos. When location information cannot be recognized due to settings of the electronic device 200, the electronic device 200 may provide the weather information based on the most recently acquired location information. Alternatively, when the sentence "play jazz music" is recognized according to the user's speech, the voice recognition module 213 may execute a music application, identify a song in a music category corresponding to jazz in the music information stored in the memory 240, and play the identified song through the speaker 230.

The wake word control module 215 may register a user wake word from text information related to the processed task. The wake word control module 215 may determine a keyword or a word, which can be registered as the user wake word, by analyzing the voice information. The wake word control module 215 may determine the words "today" and "weather" in the sentence "What's the weather like today?" as the user wake words. The wake word control module 215 may determine words related to the words "today" and "weather", "yesterday", "tomorrow", "clear", "rain", "snow", and "temperature", as the user wake words. The words related to the keywords are words derived from the word "today" or "weather", and may be synonyms thereof. The wake word control module 215 may store the determined user wake words in the memory 240. The wake word control module 215 may manage wake words such that main wake words pre-set in the electronic device 200 are distinguished from the user wake words. The wake word control module 215 may generate or acquire the user wake words based on a user's speech history or machine learning.

The wake word control module 215 may control a user wake word service based on speaker identification. The user wake word service may include the use of the user wake word in addition to the main wake word as the wake word. When the number of speakers is equal to or smaller than one, the wake word control module 215 may activate the user wake word service. When the number of speakers is larger than one, the wake word control module 215 may deactivate (or stop) the user wake word service. When the user wake word service is activated, the wake word control module 215 may enable the user wake word stored in the memory 240. When the user wake word is enabled, the wake word detection module 211 may detect the user wake word in addition to the main wake word as the wake word if the user speaks. Further, the wake word control module 215 may register a new user wake word according to the user's speech while the user wake word service is activated. Alternatively, when the user wake word service is deactivated, the wake word control module 215 may disable the user wake word stored in the memory 240. When the user wake word is disabled, the wake word detection module 211 may detect only the main wake word as the wake word if the user speaks.

The wake word control module 215 may enable the user wake word corresponding to the current condition. When the user wake word is enabled, in addition to the main wake word, the user wake word corresponding to the current condition is used as the wake word. The wake word control module 215 may enable user wake words corresponding to the current condition among the user wake words stored in the memory 240 and disable user wake words which do not correspond to the current condition. For example, "bus", "subway", "traffic information", and "bus stop" may be stored as the wake words between 7 and 8 a.m. and "lunch", "menu", "restaurant", and "famous restaurant" may be stored as the user wake words between 11 a.m. and 1 p.m. When the current time is 7:10 in the morning, the wake word control module 215 may enable the user wake words such as "bus", "subway", "traffic information", and "bus stop". Further, the wake word control module 215 may disable user wake words such as "lunch", "menu", "restaurant", and "famous restaurant". The wake word control module 215 may determine whether the current condition expires and, when the current condition expires, disable the user wake words corresponding to the current condition. When a user wake word corresponding to the current condition is enabled, in addition to the main wake word, the wake word detection module 211 may detect the user wake word corresponding to the current condition as a user wake word.

When the user wake word corresponding to the current condition is enabled, the wake word detection module 211 may detect only the main wake word as the wake word if the user speaks.

The speaker identification module 217 may identify a speaker. The speaker identification module 217 may determine whether the number of speakers is larger than one based on the frequency of the voice received from the microphone 220. Since every human voice has a unique frequency, the speaker identification module 217 may identify a speaker based on a difference in the voice frequency. Alternatively, the speaker identification module 217 may identify the speaker based on an image acquired from a camera. The speaker identification module 217 may determine the number of speakers by combining the voice frequency and the image. The speaker identification module 217 may identify the number of speakers while the voice recognition service is activated. The speaker identification module 217 may transfer speaker identification information to the wake word control module 215.

The condition determination module 219 may detect whether the current condition corresponds to a preset condition. The preset condition may include particular location information or particular time information. The condition information corresponding to the current condition may be stored in the memory 240. The condition determination module 219 may acquire current time information or current location information from the communication unit. The condition determination module 219 may determine whether the current condition (e.g., the current time or the current location) corresponds to the condition information (e.g., time condition information or location condition information) stored in the memory 240 and transfer the determination result to the wake word control module 215. The condition determination module 219 may detect whether the current condition corresponds to the preset condition while the voice recognition service is activated. Alternatively, the condition determination module 219 may detect whether the current condition corresponds to the preset condition in real time or periodically.

The electronic device 200 may include a first processor and a second processor. The first processor may include the wake word detection module 211, and the second processor may include the voice recognition module 213, the wake word control module 215, the speaker identification module 217, or the condition determination module 219. The first processor may be a low-power processor, and may control at least some functions or states related to the wake word detection module 211, the microphone 220, the speaker 230, the memory 240, or the communication unit 250 instead of the second processor while the second processor is in an inactive or sleep state.

The microphone 220 may receive an external sound signal and process the sound signal into electric voice data. Various noise-reduction algorithms may be implemented in the microphone 220 to remove noise generated in the process of receiving an external sound signal. The microphone 220 may serve to receive input of audio streaming such as a voice command (e.g., a voice command for controlling activation/deactivation of the voice recognition service).

The speaker 230 may output audio data received from the communication unit 250 or stored in the memory 240. The speaker 230 may output a sound signal related to various operations performed by the electronic device 200.

The memory 240 may store one or more programs executed by the processor 210 and also perform a function of temporarily storing (e.g., buffering) input/output data.

The input/output data may include videos, images, photos, or audio data. The memory 240 may store at least one of the main wake word, the user wake word, and the user wake word corresponding to the current condition.

The communication unit 250 may include one or more modules enabling wireless communication between the electronic device 200 and an external device (e.g., the voice-processing server). The communication unit 250 may include a mobile communication module, a WLAN module, a short-range communication module, and a location calculation module. The communication unit 250 may include a module (e.g., a short-range communication module or a long-distance communication module) for communicating with an adjacent external device.

An electronic device according to an embodiment may include a speaker; a microphone; a communication interface; a processor electrically connected to the speaker, the microphone, or the communication interface; and a memory electrically connected to the processor, wherein the memory may store instructions, and the instructions may be configured to cause the processor, when executed, to activate a voice recognition service in response to a user input, process a task for voice information input by the activated voice recognition service, register at least one user wake word by analyzing the voice information, and activate the voice recognition service in response to detection of the at least one user wake word.

The instructions may be configured to extract text information from the voice information, acquire at least one word from the text information, and register the acquired word as the user wake word.

The instructions may be configured to acquire at least one first word from the text information, acquire at least one second word related to the first word from the first word, and register the first word or the second word as the user wake word.

The instructions may be configured to acquire at least one third word based on the first word and the second word and register at least one of the first word to the third word as the user wake word.

The instructions may be configured to count an activation standby time after processing a task for the voice information, and when a voice is not detected during the activation standby time, deactivate the voice recognition service.

The instructions may be configured to, when a voice is detected in a state in which the voice recognition service is deactivated, determine whether the input voice includes a main wake word, and when the input voice includes the main wake word, initialize the registered user wake word.

The instructions may be configured to identify speakers and control the voice recognition service using the user wake word according to the number of identified speakers.

The instructions may be configured to deactivate the voice recognition service using the user wake word when the number of speakers is larger than one.

The instructions may be configured to determine whether a current condition corresponds to condition information, and when the current condition corresponds to condition information, enable at least one user wake word corresponding to the condition information.

The instructions may be configured to determine whether the condition information expires and, when the condition information expires, disable at least one user wake word corresponding to the condition information.

The user input may include at least one of a voice wake word, a touch, and a button.

The instructions may be configured to display a user interface for controlling the user wake word on a display after processing the task for the voice information.

The instructions may be configured to control the voice recognition service using the user wake word according to speaker identification.

An electronic device according to an embodiment may include a speaker; a microphone; a communication interface; a processor electrically connected to the speaker, the microphone, or the communication interface; and a memory electrically connected to the processor, wherein the memory may store instructions, and the instructions may be configured to receive at least one main wake word through the microphone, activate a voice recognition function provided from an external server in response to the received main wake word or implemented in the electronic device, receive a user's speech including at least one user wake word through the microphone, and activate the voice recognition function in response to the received user wake word without the main wake word.

The at least one main wake word may include a name or a title related to the electronic device.

The at least one user wake word may include a name or a title selected by a user.

The instructions may be configured to activate the voice recognition function in response to the received user wake word only during a set time period.

An electronic device according to an embodiment may include a speaker; a microphone; a communication interface; a processor electrically connected to the speaker, the microphone, or the communication interface; and a memory electrically connected to the processor, wherein the memory may store instructions, and the instructions may be configured to cause the processor, when executed, to receive at least one main wake word through the microphone, activate a voice recognition function provided from an external server in response to the received main wake word or implemented in the electronic device regardless of the time of day, receive at least one user wake word through the microphone, and activate the voice recognition function in response to the received user wake word during a period of time during the day.

The at least one user wake word may be related to a subject matter or a topic of a user's speech.

The at least one user wake word may be selected based on a user's speech history or machine learning.

Figure 3:
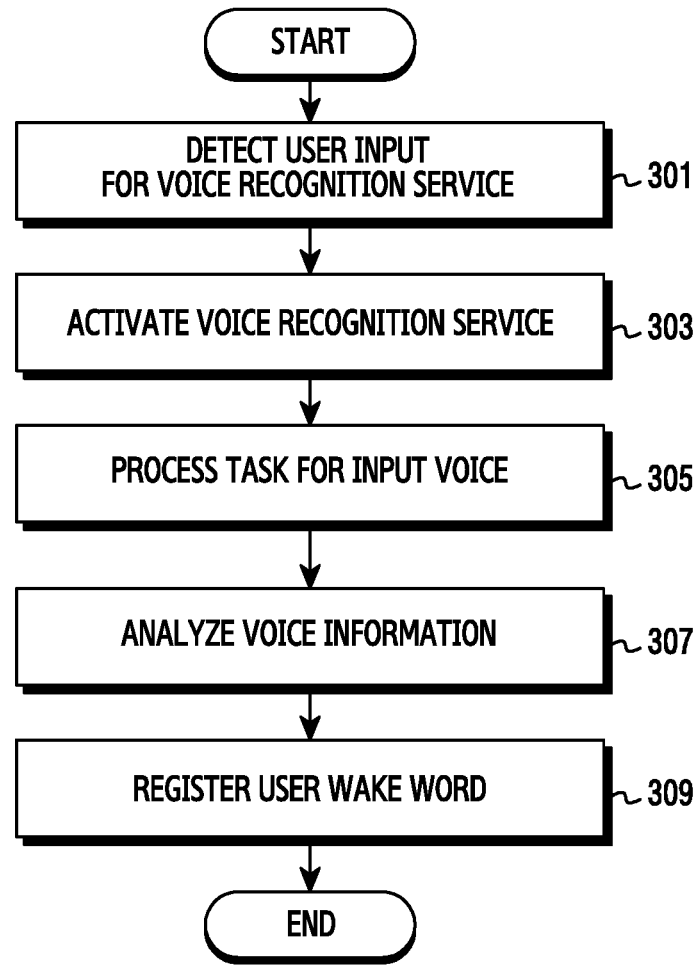
FIG. 3 is a flowchart of an operation of the electronic device, according to an embodiment.

FIG. 3 is a flowchart of an operation method of the electronic device, according to an embodiment.

Referring to FIG. 3, at step 301, the processor of the electronic device may detect user input for a voice recognition service. The user input may include at least one of a voice wake word, a touch, and a button. Hereinafter, an example of activating the voice recognition service using a voice wake word will be described, but the disclosure is not limited to the description. The electronic device may recognize a wake word transmitted through a microphone based on the first processor for recognizing a main wake word. The main wake word may be a wake word preset in the electronic device. The main wake word may include a name or a title related to the electronic device, or may include a name or a title selected by the user.

At step 303, the processor may activate the voice recognition service. When the main wake word is detected, the processor may wake up a function for voice recognition. The electronic device may wake up the second processor based on the detection of the wake word by the first processor. The processor may initiate the voice recognition according to a user's speech in response to the user input.

At step 305, the processor may process a task based on voice information. The processor may recognize voice information according to the user's speech while the voice recognition service is activated and process at least one task related to the execution of a function corresponding to the voice information. For example, when the user's speech "weather in New York" is recognized, the processor may perform an Internet search, based on "weather in New York" as a keyword, and provide found information on the weather in New York. The information on the weather in New York may include at least one of text, image, sound, and video.

At step 307, the processor may analyze voice information related to the processed task. The processor may determine a keyword or a word that can be registered as the user wake word by analyzing the voice information. For example, the processor may extract "New York" or "weather" from "weather in New York" as a keyword (e.g., a first word). The processor may acquire a related word (e.g., a second word) derived from the extracted keyword. The related word may be a word derived from the keyword such as a synonym. For example, as related words, the processor may acquire "Philadelphia", "Boston", and "Washington D.C." from the keyword "New York". Further, as related words, the processor 210 may acquire "clear", "cloudy", "rain", "snow", "temperature", and "humidity" from the keyword "weather". The processor may acquire a new word (e.g., a third word) based on the acquired keywords or related words. For example, the processor may acquire a new word "umbrella" based on the words "New York" and "rain". Alternatively, the processor may acquire the new words "fashion", "clothing", and "short sleeves" based on the words "weather" and "clear".

At step 309, the processor may register at least one user wake word (or second wake word) based on the analysis result. The processor may primarily register "New York" and "weather" (e.g., store "New York" and "weather" in the memory) as the user wake words. The processor may manage wake words such that the main wake word preset in the electronic device 200 is distinguished from the user wake word. The processor may configure the main wake word not to be accessed or changed by the user and the user wake word to be changed, modified, deleted, and added by the user. The processor may secondarily register "Philadelphia", "Boston", "Washington D.C.", "clear", "cloudy", "rain", "snow", "temperature", and "humidity" as user wake words. Further, the processor may tertiarily register "umbrella", "fashion", "clothing", and "short sleeves" as user wake words. The processor may not register the secondarily or tertiarily acquired user wake words.

The processor may register user wake words through various input schemes such as a gesture, Morse code, a specific code word, text, and vision. When the voice recognition service is activated, the processor may detect a gesture (e.g., sign language) or a user's visual angle through a camera and register the detected gesture or user's visual angle as the user wake word. Alternatively, when the voice recognition service is activated, the processor may receive at least one of Morse code, a specific code word, and text through the input device, and register the received Morse code, specific code word, or text as the user wake word. An electronic device may perform steps 301 to 309 during connection to a power supply device (e.g., a charger).

Figure 4:
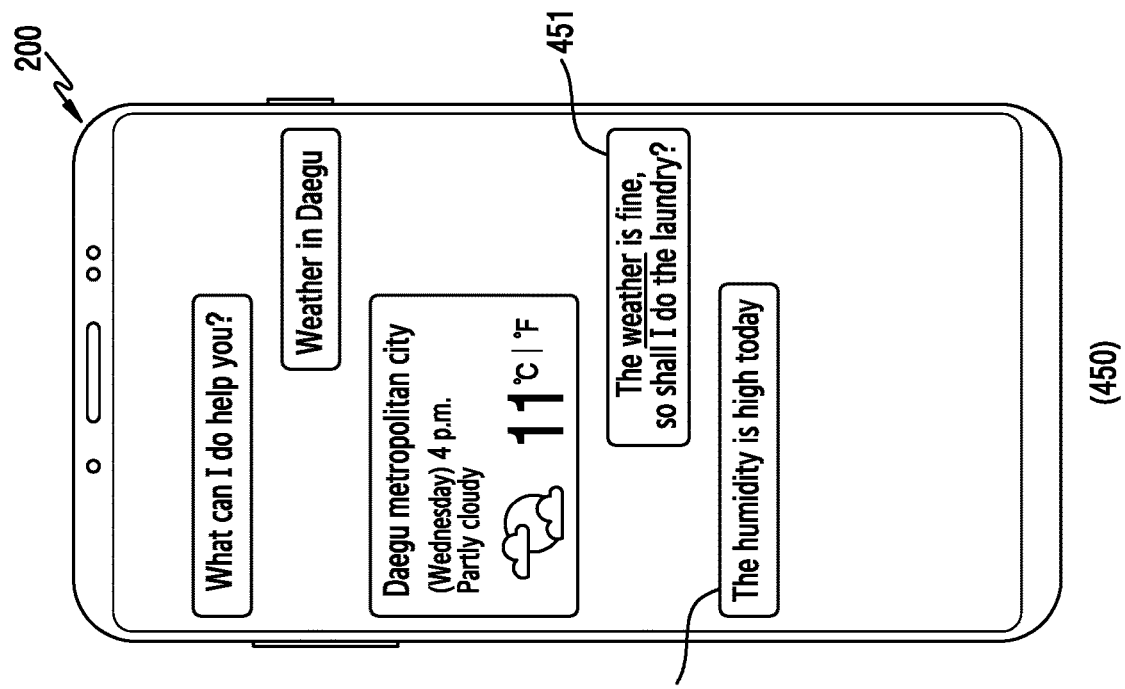
FIG. 4 is a diagram of a voice recognition service using a user wake word, according to an embodiment.
Figure 4:
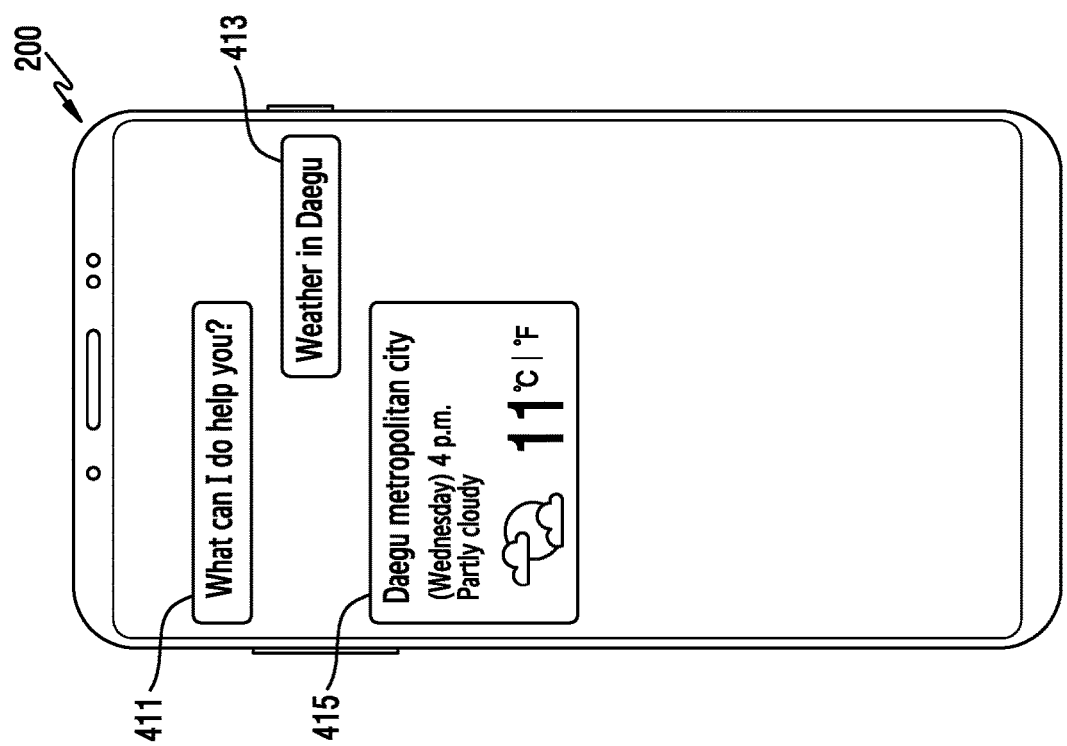

FIG. 4 is a diagram of activating the voice recognition service using a user wake word, according to an embodiment.

Referring to FIG. 4, a processor 210 or the electronic device 200 may provide a first user interface 410 for recognizing a voice through activation of the voice recognition service. The processor may indicate that the voice recognition service is activated in response to the main wake word. The processor may provide a notification message 411 indicating activation of the voice recognition service. Although FIG. 4 illustrates that the notification message 411 is displayed on a display, the processor may output a voice corresponding to the notification message 411 through the speaker while displaying the notification message 411. The notification message 411 may include at least one of text, image, sound, and video.

After providing the notification message 411, the processor may successively receive user's speech within an activation standby time (e.g., 3 seconds or 5 seconds) and recognize the voice. The processor may recognize the voice for the user's speech by itself or by interworking with the voice-processing server. The processor may display first voice information 413 obtained by recognizing the voice on the display and process a task corresponding to the first voice information 413. The processor may display first task information 415 corresponding to the first voice information 413 on the display. Alternatively, the processor may output the voice corresponding to the first task information 415 through the speaker. The first task information 415 may include at least one of text, image, sound, and video.

The processor may analyze the first voice information 413 after or simultaneously with the provision of the first task information 415 and register the user wake word. For example, the processor may register "Daegu" and "weather" as user wake words. Alternatively, the processor may register "Seoul", "Busan", "temperature", and "humidity" as user wake words. When no user's speech is detected until the activation standby time passes after the first task information 415 is provided, the processor may deactivate (or stop) the voice recognition service.

The processor may provide a second user interface 450 for recognizing the voice by providing the first task information 415, and, after the activation standby time passes, recognizing the user's speech. The second user interface 450 is an example of receiving the user's speech in the state in which the voice recognition service is deactivated. The processor may determine whether the wake word is included in second voice information 451 obtained by recognizing the voice. Here, the wake word may include both the main wake word and the user wake word. For example, the processor may recognize "weather" included in the second voice information 451 as the user wake word and determine that the wake word is detected. When the wake word is detected, the processor may activate the voice recognition service.

The processor may activate the deactivated voice recognition service again as the wake word is detected. Although FIG. 4 illustrates that the notification message informing re-activation of the deactivated voice recognition service is not provided, the notification message may be provided. The processor may display the second voice information 451 obtained by recognizing the voice on the display and process a task corresponding to the second voice information 451. The processor may display second task information 453 corresponding to the second voice information 451 on the display. Alternatively, the processor may output the voice corresponding to the second task information 453 through the speaker 230. The second task information 453 may include at least one of text, image, sound, and video.

The processor may analyze the second voice information 451 after or simultaneously with the provision of the second task information 453 and register the user wake word. For example, the processor may register "weather" and "laundry" as user wake words. Alternatively, the processor may register "temperature", "humidity", "laundry", "washing method", "detergent", and "dryer" as user wake words. When no user's speech is detected until the activation standby time passes after the second task information 453 is provided, the processor may deactivate (or stop) the voice recognition service. Alternatively, the processor may recognize the user wake word only for the user's speech (e.g., the first voice information 413) input after the main wake word without registering the user wake word for the second voice information 451. This may be changed according to settings of the electronic device 200 or settings of the user.

The electronic device may activate the voice recognition service when a preset wake word (e.g., the main wake word) is detected. When no voice command is received from the user before the activation standby time passes after a response to the user's speech is provided while the voice recognition service is activated, the electronic device may stop the execution of the voice recognition service. In order to activate the deactivated voice recognition service again, the main wake word must first be spoken in the conventional art. However, according to the disclosure, by registering the user wake word together with the main wake word as the wake word, it is possible to activate the voice recognition service when the user wake word is detected even though the main wake word is not detected.

Figure 5:
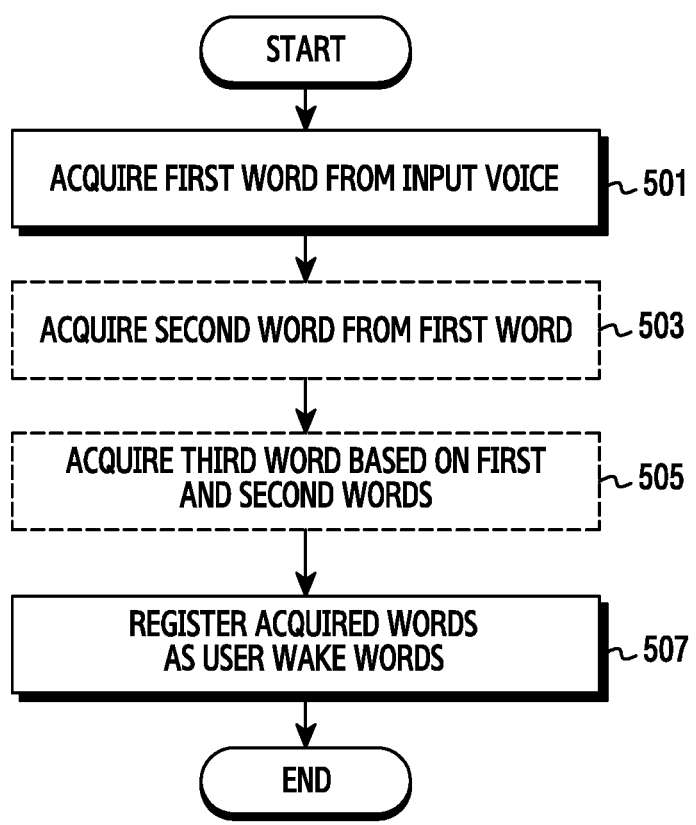
FIG. 5 is a flowchart of a method of registering a user wake word of the electronic device, according to an embodiment.

FIG. 5 is a flowchart of a method of registering a user wake word of the electronic device, according to an embodiment. The flowchart of FIG. 5 shows steps 307 and 309 of FIG. 3 in detail.

Referring to FIG. 5, at step 501, the processor 210 or the wake word control module 215 of the electronic device may acquire a first word from the input voice. For example, when the user's speech "I want to eat steak for lunch, so is there a restaurant around the office you recommend?" is received, the processor may acquire a first word by analyzing voice information according to the user's speech. The processor may acquire the first word (or keyword) from text information converted from the voice information. The dictionary definition of the keyword may be "a word or a phrase extracted from a title or content in order to express the recorded content". Accordingly, in the dictionary definition, the keyword includes a word and a phrase, and may be a concept including the word. For example, the first word may include at least one of "lunch", "steak", "office", or "recommend".

At step 503, the processor may acquire a second word from the acquired first word. The processor may acquire the second word, which can be inferred or derived from the first word. The second word may be a synonym of the first word. For example, the second word may include at least one of "luncheon", "beef", "location information (for example, New York)" corresponding to the office, and "highly recommended".

At step 505, the processor may acquire a third word based on the first word or the second word. The processor may acquire a new third word by combining the first word and the second word. For example, the third word may include "famous restaurant".

Steps 503 and 505 may not be performed. For example, only steps 501 and 507 may be performed, and steps 503 and 505 may be omitted according to settings of the electronic device or settings of the user.

At step 507, the processor 210 may register the acquired word as at least one user wake word. For example, the processor 210 may register at least one of "lunch", "steak", "office", "recommend", "meal", "beef", "New York", "highly recommend", and "famous restaurant" as user wake words (e.g., may store at least one of them in the memory). The user wake word may be relevant to a subject matter or a topic of the user's speech. Alternatively, the user wake word may be selected from a user's speech history or machine learning.

When the user's speech "I want to eat steak for lunch, so is there a restaurant around the office you recommend?" is received, the processor may process voice recognition for the user's speech and output a message such as "A steak restaurant around the office is XXX" (e.g., display the message on the display or output the message through the speaker). Next, when the user's speech "Is that a famous restaurant?" is received, the processor may process voice recognition for the user's speech and output a message such as "It is registered as a famous restaurant and got 10 scores twice within last one month.". When steps 501 to 507 are performed, the processor may register "famous restaurant" as well as the main wake word as the user wake words.

The processor may analyze voice information only for the user's speech input after the main wake word and register the user wake word. Alternatively, the processor may analyze voice information for the user's speech input for a predetermined time (e.g., one hour, three hours, one day, or one week) after the main wake word and register the user wake word. When a predetermined time passes, the processor may automatically delete the registered user wake word from the memory. Alternatively, the processor may inform the user of the deletion of the user wake word before deleting the user wake word and delete the user wake word according to the user's selection. Alternatively, when a preset input (e.g., touch, gesture, or button selection) is received from the user, the processor may delete the user wake word. Alternatively, the processor may provide a list including user wake words stored in the memory according to a user's request (e.g., see the user wake words or edit the user wake words), and when user input for deleting at least one or all of the user wake words included in the list is received, delete the user wake words selected by the user.

Figure 6:
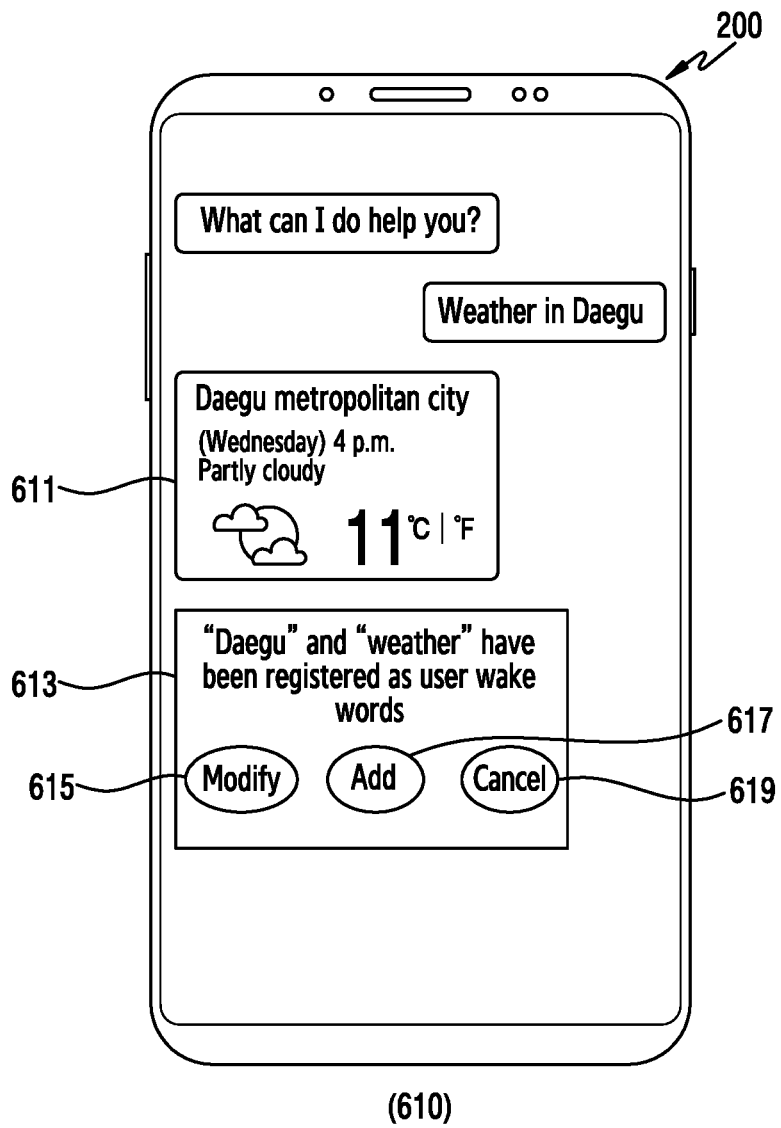
FIG. 6 is a diagram of editing a user wake word, according to an embodiment.

FIG. 6 is a diagram of registering a user wake word, according to an embodiment.

Referring to FIG. 6, the processor of the electronic device 200 may provide a user interface 610 for registering the user wake word. The user interface 610 may provide task information 611 in response to voice information of "weather in Daegu" and may include a message 613 indicating that "Daegu" and "weather" from the voice information are registered as user wake words. The message 613 may include a phrase providing notification of the user wake words, a modify button 615, an add button 617, and a cancel button 619. When the modify button 615 is selected, the processor may provide the user interface for modifying "Daegu" or "weather". The user interface may display "Daegu" or "weather" in an input field and may include a keypad (or a keyboard). When the add button 617 is selected, the processor may provide the user interface including an input field or a keypad. The input field of the user interface may be empty, in which case nothing is displayed. When the cancel button 619 is selected, the processor may provide a user interface indicating that "Daegu" or "weather" is deleted from the user wake words. When no user speech is detected until the activation standby time passes after the user interface is provided, the processor may deactivate the voice recognition service.

Figure 7:
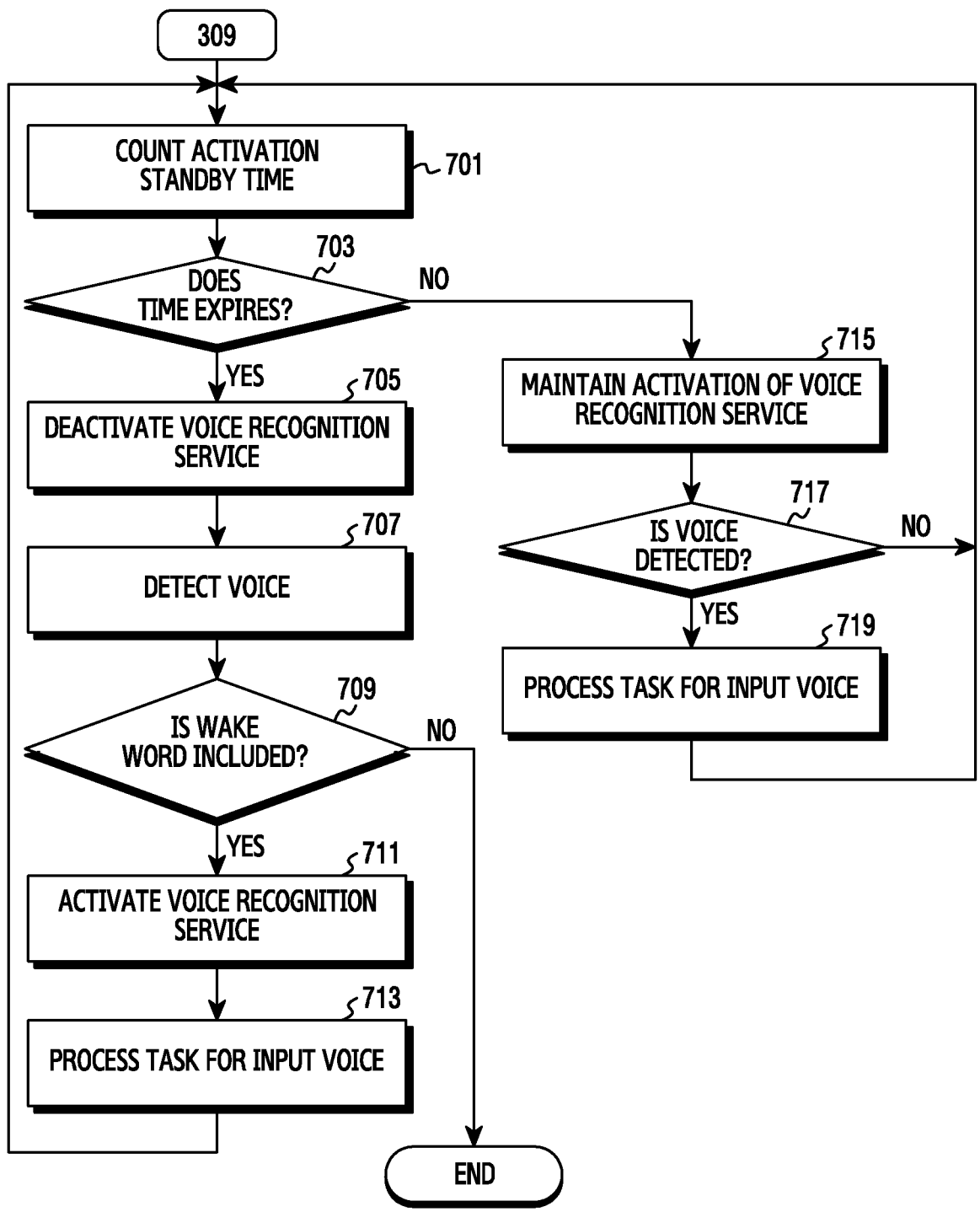
FIG. 7 is a flowchart of a method of activating the voice recognition service using a user wake word, according to an embodiment.

FIG. 7 is a flowchart of a method of activating the voice recognition service using a user wake word, according to an embodiment. The flowchart of FIG. 7 may be performed after step 309 of FIG. 3.

Referring to FIG. 7, at step 701, the processor 210 or the voice recognition module 213 of the electronic device may count the activation standby time. The activation standby time may be analyzed as at least one of an end point detection (EPD) time, an input standby time, and a microphone record standby time. The activation standby time may be a standby time for determining that the voice input ends. The processor starts the count from the time point at which a voice input (e.g., a first voice input) is completed (or the time point at which task information corresponding to the first voice input is provided), and when the voice input (e.g., a second voice input) is detected again before the activation standby time expires, count the activation standby time at the beginning. The processor may count the activation standby time while the voice recognition service is activated.

At step 703, the processor may determine whether the activation standby time expires. When the activation standby time is 5 seconds, the processor may count the activation standby time from the time point at which the first voice input is completed (or the time point at which task information corresponding to the first voice input is provided), and when the second voice input is detected at the time point at which the activation standby time is counted for 3 seconds, delete (or ignore) the activation standby time counted up to that point in time, and count the activation standby time again from the time point at which the second voice input is completed.

When the activation standby time has expired (e.g., "Yes" in step 703), the processor may perform step 705. When the activation standby time has not expired (e.g., "No" in step 703), the processor may perform step 715.

When the activation standby time expires, the processor may deactivate the voice recognition service at step 705. When the activation standby time expires, the processor may determine that the voice input is completed. When the voice recognition service is deactivated, the processor may stop the execution of elements required for voice recognition in order to perform low-power driving. For example, when the voice input is completed, the processor may stop reception of the voice input or a voice record received from the microphone.

At step 707, the processor 210 or the wake word detection module 211 may detect a voice. The processor may detect reception of the voice through the microphone. The processor may temporarily store the received voice in the memory.

At step 709, the processor may determine whether the detected voice includes a wake word. The wake word may include a main wake word set in the electronic device or a user wake word registered by the user. The processor may extract text information from the voice (or voice file) stored in the memory and determine whether a first word of the extracted text information matches the wake word stored in the memory. Alternatively, the processor may determine whether at least one word included in the extracted text information matches the wake word stored in the memory. Alternatively, the processor may determine whether the last word of the extracted text information matches the wake word stored in the memory. The method of matching the text information and the wake word may vary depending on settings of the electronic device or settings of the user.

The processor may perform step 711 when the detected voice includes the wake word (e.g., "Yes" at step 709), and may end the operation when the detected voice does not include the wake word (e.g., "No" at step 709).

When the detected voice includes the main wake word, the processor may perform step 711. Alternatively, when the detected voice includes the user wake word, the processor may perform step 711. However, the processor may end the operation when the detected voice includes neither the main wake word nor the user wake word. In the conventional art, in order to recognize the voice in the state in which the voice recognition service is deactivated, the main wake word must essentially be spoken. However, in the present disclosure, the voice recognition service may be activated not only when the main wake word but also when the user wake word is spoken.

When the detected voice includes the wake word, the processor may activate the voice recognition service at step 711. When the wake word is detected, the processor may wake up a function for voice recognition. Since step 711 is the same as or similar to step 303, a detailed description thereof will be omitted.

At step 713, the processor may process a task based on voice information. The processor may recognize voice information including a wake word or voice information excluding a wake word from the user's speech and execute a function corresponding to the voice information while the voice recognition service is activated. When the wake word is the main wake word, the processor may recognize voice information excluding the main wake word and execute a function corresponding to the voice information. Alternatively, when the wake word is the user wake word, the processor may recognize voice information including the user wake word and execute a function corresponding to the voice information. Alternatively, even when the wake word is the user wake word, the processor may recognize voice information excluding the user wake word and execute a function corresponding to the voice information.

When the activation standby time does not expire, the processor may keep the voice recognition service activated at step 715. Step 701 is a step performed while the voice recognition service is activated, and when the activation standby time does not expire, the processor may maintain the active state of the voice recognition service at step 715.

At step 717, the processor may determine whether the voice is detected. The processor may determine whether new speech is input from the user in the state in which the voice recognition service is activated.

The processor may perform step 719 when a voice is detected (e.g., "Yes" at step 717), and return to step 701 when a voice is not detected (e.g., "No" at step 717). When returning to step 701, the processor may determine whether the user's speech is input before the activation standby time expires.

When the voice is detected, the processor may process a task for the input voice at step 717. The processor may recognize voice information according to the user's speech and process at least one task related to the execution of a function corresponding to the voice information while the voice recognition service is activated. Since step 719 is the same as or similar to step 305, a detailed description thereof will be omitted.

Figure 8:
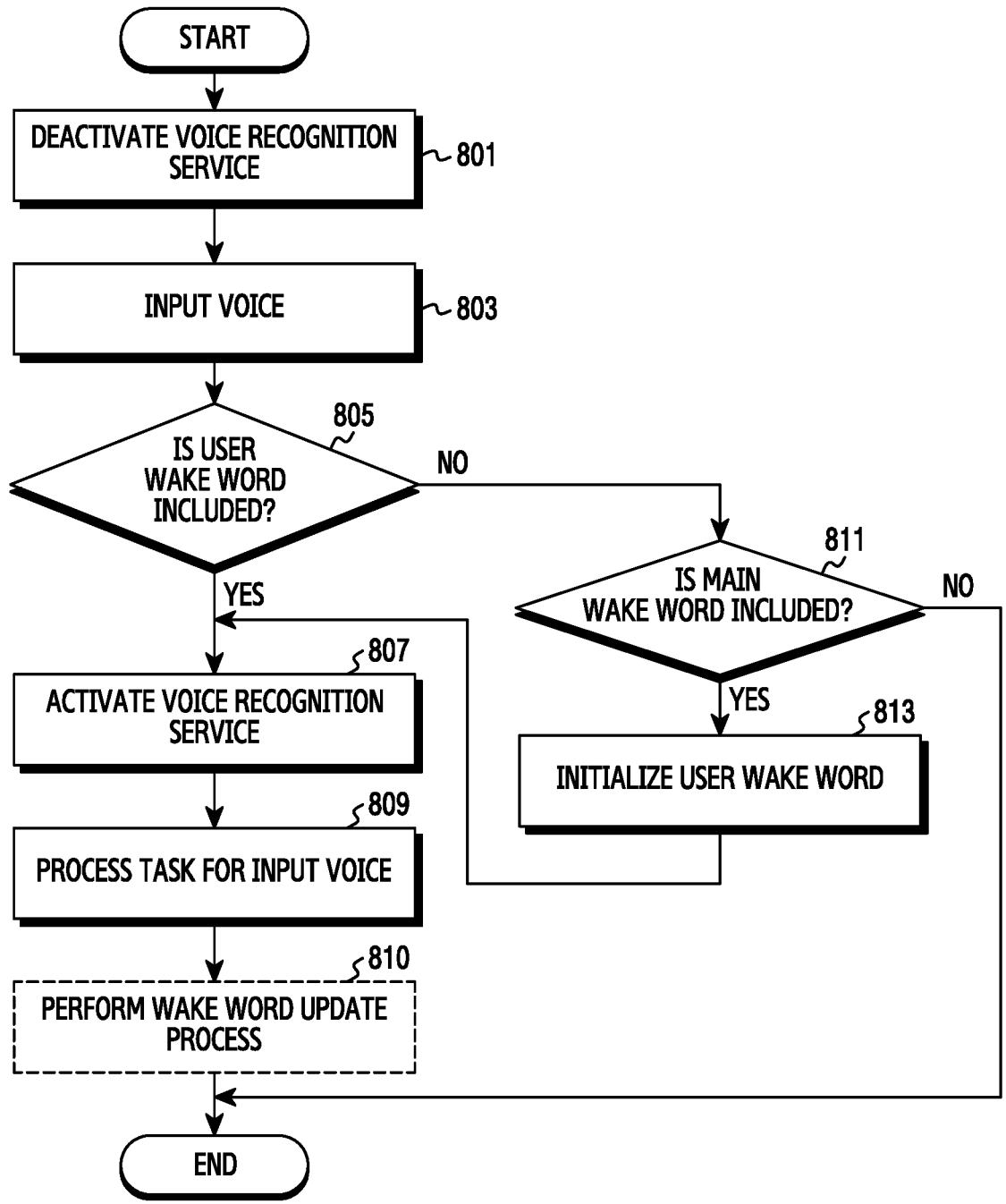
FIG. 8 is a flowchart of a method of initializing a user wake word, according to an embodiment.

FIG. 8 is a flowchart of a method of initializing a user wake word, according to an embodiment.

Referring to FIG. 8, at step 801, the processor 210 or the voice recognition module 213 of the electronic device may deactivate the voice recognition service. When the activation standby time expires, the processor may determine that the voice input is completed and deactivate the voice recognition service. Since step 801 is the same as or similar to step 705, a detailed description thereof will be omitted.

At step 803, the processor 210 or the wake word detection module 211) may receive the voice input. The processor may detect reception of the voice through the microphone. The processor may temporarily store the received voice in the.

At step 805, the processor may determine whether the detected voice includes a user wake word. The user wake word may be a wake word registered by the user. The wake word determined at step 805 may be only the user wake word, not the main wake word. The processor may extract text information from the voice (or voice file) stored in the memory and determine whether all or some pieces (e.g., a first word) of the extracted text information match the user wake word stored in the memory.

The processor may perform step 807 when the detected voice includes the user wake word (e.g., "Yes" at step 805), and perform step 811 when the detected voice does not include the user wake word (e.g., "No" at step 805). The processor may perform step 807 when the detected voice includes the user wake word, and perform step 813 when the detected voice includes the main wake word.

When the detected voice includes the user wake word, the processor may activate the voice recognition service at step 807. For example, the processor may wake up a function for voice recognition when the user wake word is detected. Since step 807 is the same as or similar to step 303, a detailed description thereof will be omitted.

At step 809, the processor may process a task based on voice information. The processor may recognize voice information according to the user's speech while the voice recognition service is activated and process at least one task related to the execution of a function corresponding to the voice information. Since step 809 is the same as or similar to step 305, a detailed description may be omitted.

At step 810, the processor or the wake word control module 215) may perform a wake word update process. The wake word update process may include an operation of registering the user wake word by analyzing voice information according to the user's speech. The wake word update process may include steps 307 and 309. Operation 810 may not be performed according to settings of the electronic device or settings of the user. When the voice recognition service is activated using the user wake word, the processor may not perform the wake word update process. Alternatively, when the voice recognition service is activated using the user wake word, the processor may perform the wake word update process.

When the detected voice does not include the user wake word, the processor may determine whether the detected voice includes the main wake word at step 811. The main wake word may be a wake word preset in the electronic device. The processor may extract text information from the voice (or voice file) stored in the memory and determine whether all or some (e.g., a first word) of the extracted text information match the main wake word set in the electronic device.

Although FIG. 8 illustrates that step 805 of determining whether the detected voice includes the user wake word is first performed and then step 811 of determining whether the detected voice includes the main wake word is performed, step 811 may be first performed and then step 805 may be performed, or steps 805 and 811 may be performed simultaneously. This is only a problem with regard to implementation, and the present disclosure is not limited by the detailed description and the drawings.

When the detected voice includes the main wake word (e.g., "Yes" at step 811), the processor may perform step 813. When the detected voice does not include the main wake word (e.g., "No" at step 811), the processor may end the operation. The processor may end the operation when the detected voice includes neither the user wake word nor the main wake word.

When the detected voice includes the main wake word, the processor may initialize the user wake word at step 813. The initialization may refer to deleting the user wake word stored in the memory. When the main wake word is detected as the wake word, the processor may delete the user wake word stored in the memory. Speaking the main wake word may serve as a command for deleting the user wake word. An operation of recognizing that speaking the main wake word is the command for deleting the user wake word may be determined according to settings of the electronic device or setting of the user. The processor may inform the user of whether to delete the user wake word before deleting the user wake word and may delete the user wake word according to a user's selection.

After deleting the user wake word, the processor may return to step 807. When returning to step 807 after deleting the user wake word, the processor may perform the wake word update process at step 810.

Figure 9:
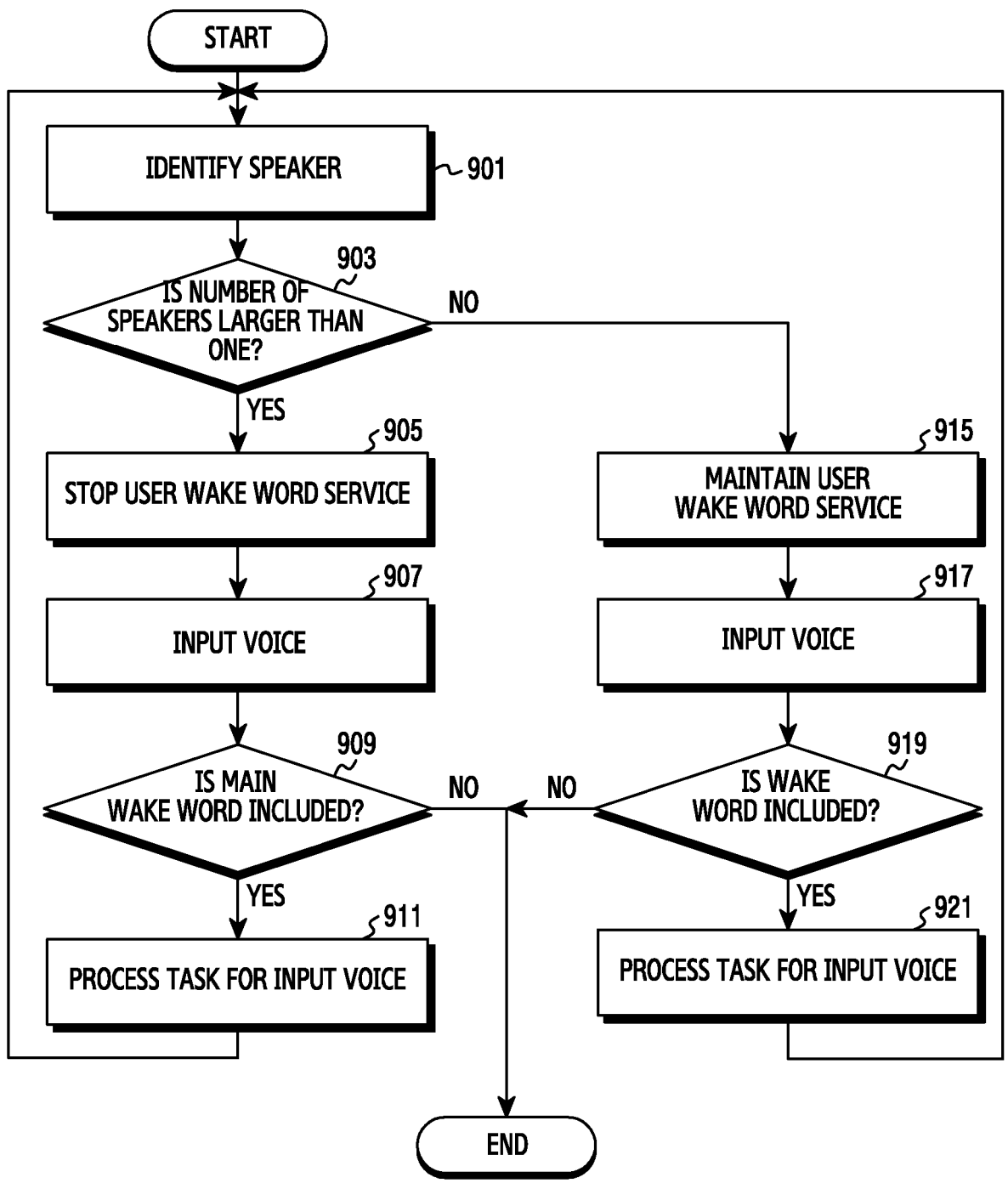
FIG. 9 is a flowchart of a method of controlling a user wake word service based on the number of speakers, according to an embodiment.

FIG. 9 is a flowchart of a method of controlling a user wake word service based on the number of speakers, according to an embodiment.

Referring to FIG. 9, at step 901, the processor 210 or the speaker identification module 217) of the electronic device 200 (for example, the electronic device 101) may identify a speaker. The processor may determine whether the number of speakers is larger than one based on the frequency of a voice received from the microphone. The processor may identify the speaker based on a difference in a voice frequency that everyone has. Alternatively, the processor may identify the speaker based on an image acquired from the camera. The processor may determine the number of speakers by combining the voice frequency and the image.

Step 901 may be performed while the voice recognition service is activated. Step 901 may be performed during the activation standby time or before the activation standby time expires. The processor may determine whether the activation standby time expires simultaneously or sequentially with the performance of step 901.

At step 903, the processor may determine whether the number of speakers is larger than one. The processor may determine whether the number of speakers is larger than one in at least one of the following manners: in real time, periodically, or in the state in which the voice recognition service is activated.

When the number of speakers is larger than one (e.g., "Yes" at step 903), the processor may perform step 905. When the number of speakers is not larger than one (e.g., "No" at step 903), the processor may perform step 915.

When the number of speakers is larger than one, the processor may deactivate the user wake word service at step 905. The user wake word service may refer to using the user wake word in addition to the main wake word as the wake word for activating the voice recognition service. However, when the number of speakers is larger than one, the electronic device may perform voice recognition in the conversation between speakers and process a task. This may unnecessarily consume power and decrease user convenience. When the number of speakers is larger than one, the processor may disable the user wake word stored in the memory by deactivating the user wake word service. When the user wake word is disabled, the processor may detect only the main wake word as the wake word if the user speaks.

At step 907, the processor may receive the voice input. The processor may detect reception of the voice through the microphone. The processor may temporarily store the received voice in the memory.

At step 909, the processor may determine whether the detected voice includes the main wake word. When the voice is detected in the state in which the user wake word service is deactivated, the processor may determine whether the detected voice includes the main wake word.

When the detected voice includes the main wake word (e.g., "Yes" at step 909), the processor may perform step 911. When the detected voice does not include the main wake word (e.g., "No" at step 909), the processor may end the operation. In order to recognize the voice in the state in which the user wake word service is deactivated, the main wake word must be spoken unconditionally.

When the detected voice includes the main wake word, the processor may process a task for the input voice at step 911. Since the voice recognition service may be activated at steps 901 to 907, the processor may immediately execute the function for the recognized voice without needing to activate the voice recognition service. The processor may return to step 901 after processing the task. When returning to step 901, the processor may determine whether the activation standby time expires simultaneously or sequentially with the speaker identification.

When the number of speakers is not larger than one, the processor may maintain (or stop) the user wake word service at step 915. The user wake word service may be always activated while the voice recognition service is activated. Accordingly, the maintenance of the user wake word service may mean keeping the user wake word service in the active state. The processor may enable the user wake word stored in the memory when the user wake word service is activated. When the user wake word is enabled, the processor may detect the user wake word in addition to the main wake word as the wake word if the user speaks. Further, the processor may register a new user wake word according to the user's speech while the user wake word service is activated.

At step 917, the processor may receive the voice input. The processor may detect reception of the voice through the microphone. The processor may temporarily store the received voice in the memory.

At step 919, the processor 210 may determine whether the detected voice includes a wake word. The wake word may include both the main wake word and the user wake word. That is, when the voice is detected in the state in which the user wake word service is activated, the processor may determine whether the detected voice includes the main wake word or the user wake word.

The processor may perform step 921 when the detected voice includes the wake word (e.g., "Yes" at step 919), and may end the operation when the detected voice does not include the wake word (e.g., "No" at step 919). The processor may perform a voice recognition function if the user speaks at least one of the main wake word and the user wake word in the state in which the user wake word service is activated.

When the detected voice includes the wake word, the processor may process a task for the input voice at step 921. Since the voice recognition service may be activated at steps 915 to 919, the processor may immediately execute the function for the recognized voice without needing to activate the voice recognition service. The processor may return to operation 901 after processing the task.

Figure 10A:
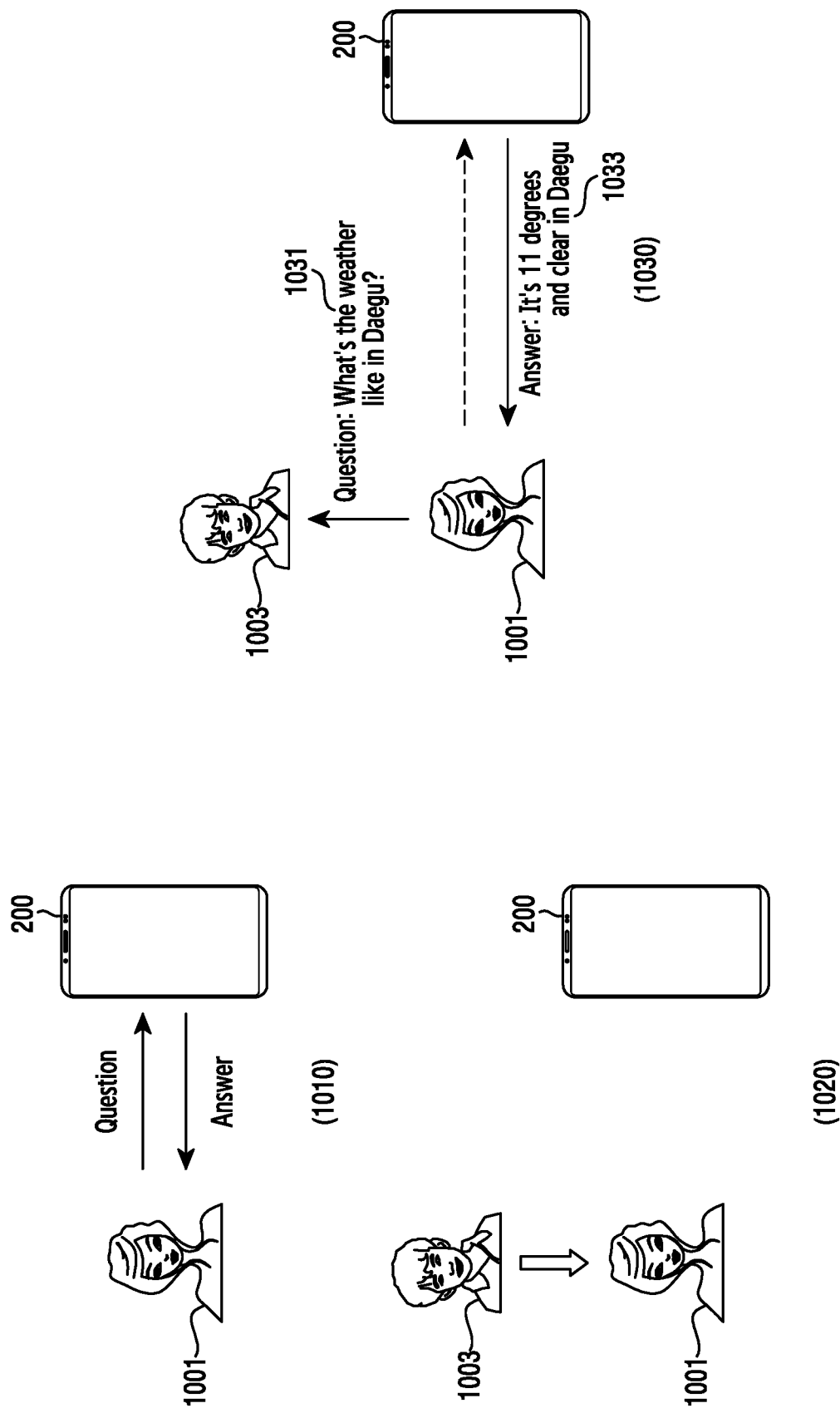
FIGS. 10A and 10B are diagrams of controlling the user wake word service, according to an embodiment.
Figure 10B:
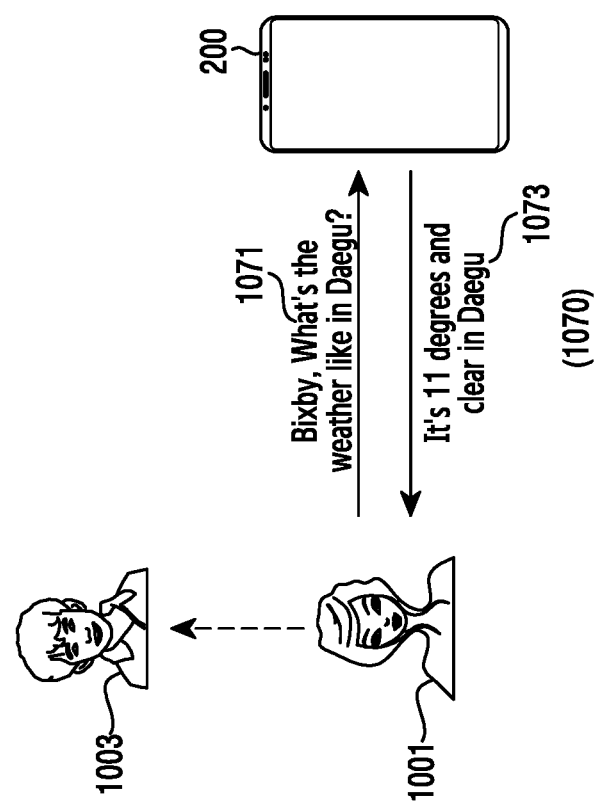
Figure 10B:
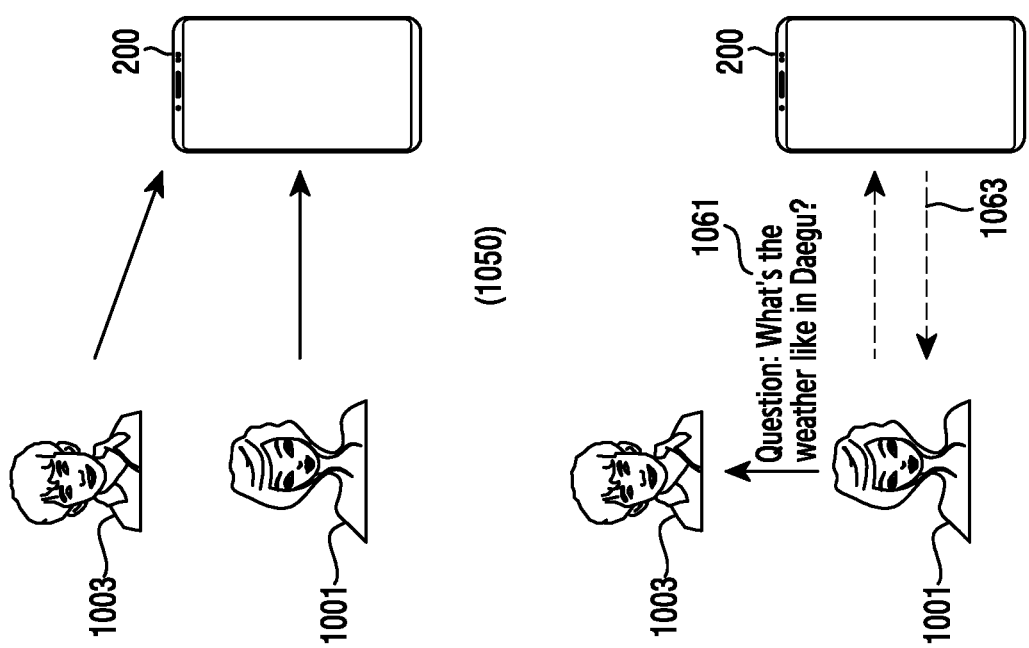

FIGS. 10A and 10B are diagrams of controlling a user wake word service, according to an embodiment.

FIG. 10A illustrates an example of activating the user wake word service regardless of the number of speakers.

Referring to FIG. 10A, a first situation 1010 corresponds to an example of providing the voice recognition service between a first user 1001 and the electronic device 200 in one-to-one correspondence. Since the user wake word service is activated in the first situation 1010, the electronic device 200 may provide the voice recognition service when the main wake word or the user wake word is detected from the first user 1001.

The second situation 1020 corresponds to an example of adding a second user 1003 in the first situation 1010. Since the user wake word service is also activated in the second situation 1020, the electronic device 200 may provide the voice recognition service when the main wake word or the user wake word is detected from the first user 1001 or the second user 1003.

The third situation 1030 corresponds to an example of detecting a wake word in the second situation 1020. Since the user wake word service is also activated in the third situation 1030, the electronic device 200 may provide the voice recognition service when the main wake word or the user wake word is detected from the first user 1001 or the second user 1003. However, although speech 1031 of the first user 1001 is directed to the second user 1003, the electronic device 200 may process a task for voice information and provide a response to the speech 1031 since the speech 1031 of the first user 1001 includes a user wake word (e.g., Daegu or weather). When the user wake word is detected in the state in which the user wake word service is activated, the electronic device 200 performs voice recognition and thus provides the response 1033 even though the speech 1031 of the first user 1001 is directed to the second user 1003.

FIG. 10B illustrates an example of controlling the user wake word service according to speaker identification.

Referring to FIG. 10B, a fourth situation 1050 corresponds to an example in which the electronic device 200 identifies a speaker and controls the user wake word service. The electronic device 200 may detect the first user 1001 and the second user 1003 through speaker identification in the fourth situation 1050. The electronic device 200 may deactivate (or stop) the user wake word service in the fourth situation 1050 when it is determined that the number of speakers is larger than one.

The fifth situation 1060 corresponds to an example in which users talk to each other in the state in which the electronic device 200 has deactivated the user wake word service. Since the user wake word service is deactivated in the fifth situation 1060, the electronic device 200 may provide the voice recognition service only when the main wake word is detected. In the state in which the user wake word service is deactivated, the user wake word (e.g., Daegu or weather) may be disabled in the electronic device 200. Even though the speech 1061 of the first user 1001 is directed to the second user 1003 in the fifth situation 1060, the electronic device 200 may not provide a response 1063 to the speech 1061 of the first user 1001. This is because the electronic device 200 does not activate the voice recognition service when the main wake word is not included in the speech 1061 in the state in which the user wake word service is deactivated in the fifth situation 1060.

The sixth situation 1070 corresponds to an example in which the electronic device 200 provides a response to a user's speech in the state in which the user wake word service is deactivated. Since the number of speakers is larger than one in the sixth situation 1070, the electronic device 200 may deactivate the user wake word service. In the sixth situation 1070, the electronic device 200 may detect the speech 1071 of the first user 1001 and determine whether the speech 1071 includes the main wake word. When the speech 1071 includes the main wake word (e.g., "Bixby"), the electronic device 200 may process a task for the speech 1071 and provide a response 1073. The electronic device 200 may provide the voice recognition function only when the main wake word is detected in the state in which the user wake word service is deactivated.

Figure 11:
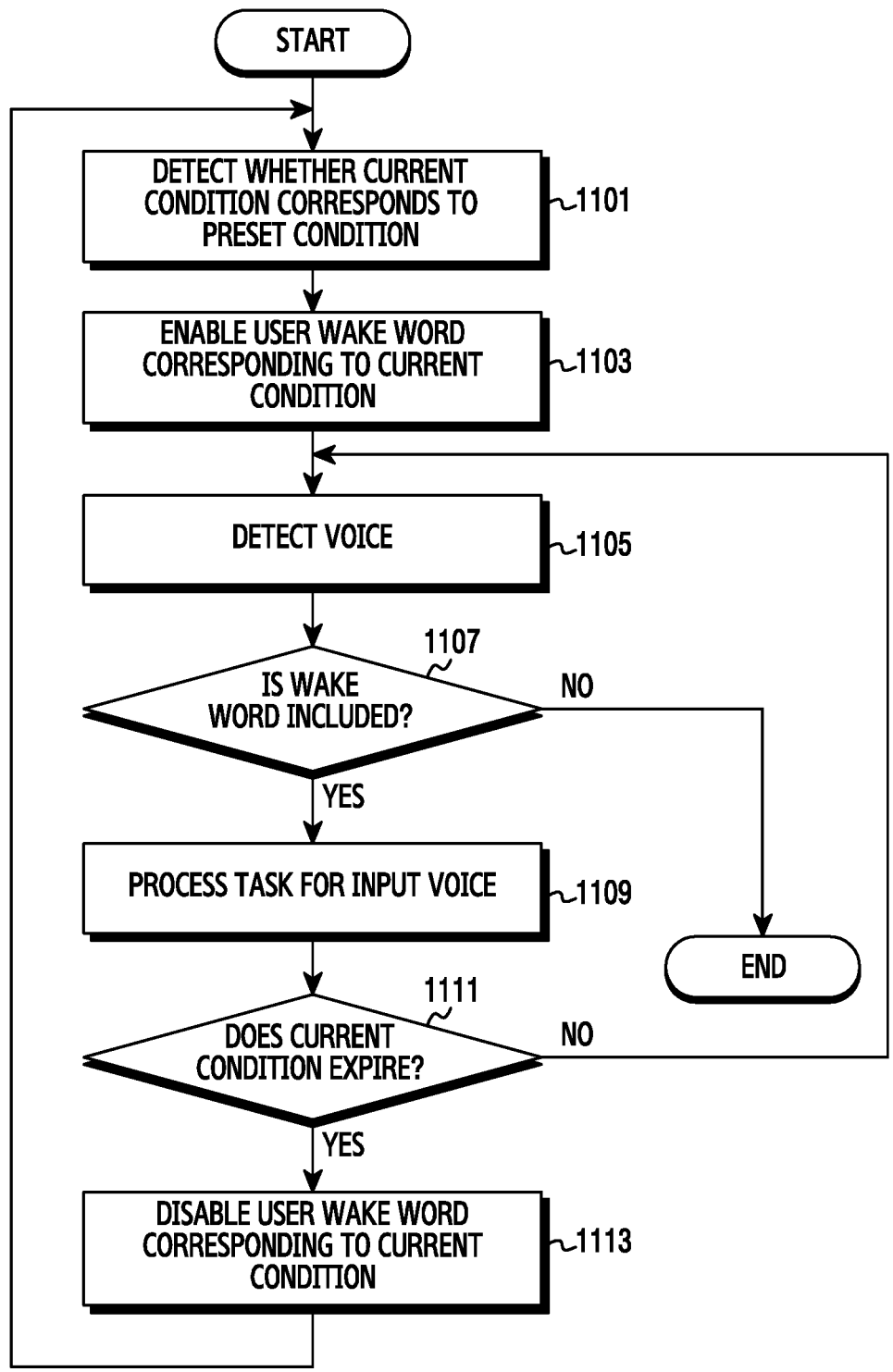
FIG. 11 is a flowchart of a method of controlling a user wake word based on a current condition, according to an embodiment.

FIG. 11 is a flowchart of a method of controlling a user wake word based on a current condition, according to an embodiment.

Referring to FIG. 11, at step 1101, the processor 210 of the electronic device may detect whether the current condition corresponds to a preset condition (e.g., condition information). The preset condition may include particular location information or particular time information. The condition information corresponding to the current condition may be stored in the memory. The processor may determine whether the current condition corresponds to the condition information stored in the memory. The processor may detect whether the current condition corresponds to the preset condition while the voice recognition service is activated. Alternatively, the processor may detect whether the current condition corresponds to the preset condition in real time or periodically.

At step 1103, the processor may enable at least one user wake word corresponding to the current condition. When the current time is 7:10 in the morning and the time information, which is 7:10 in the morning, corresponds to the preset condition, the processor may enable the user wake word corresponding to the time information. For example, when user wake words (e.g., "bus", "subway", "route map", and "schedule") corresponding to time information (e.g., 7 to 9 a.m.) stored in the memory are stored, the processor may enable the user wake words. Alternatively, when the current location is "Gangnam-gu, Seoul" and the location information, which is "Gangnam-gu, Seoul", corresponds to the preset condition, the processor may enable the user wake word corresponding to the location information. When user wake words (for example, "lunch", "menu", "restaurant", and "schedule") corresponding to the location information (for example, Gangnam-gu, Seoul) stored in the memory are stored, the processor may enable the user wake words. When the user wake words are enabled, the processor may provide the voice recognition service if the user wake word is detected together with the main wake word.

At step 1105, the processor may detect a voice. The processor may detect reception of the voice through the microphone. The processor may temporarily store the received voice in the memory.

At step 1107, the processor may determine whether the detected voice includes a wake word. The wake word may include the main wake word set in the electronic device and the user wake word corresponding to the current condition.

The processor may perform step 1109 when the detected voice includes the wake word (e.g., "Yes" at step 1107), and may end the operation when the detected voice does not include the wake word (e.g., "No" at step 1107).

When the detected voice includes the wake word, the processor may process a task for the input voice at step 1109.

Since the voice recognition service may be activated at steps 1101 to 1107, the processor may immediately execute the function for the recognized voice without the need to activate the voice recognition service. Alternatively, when the voice recognition service is deactivated, the processor may execute the function for the detected voice after activating the voice recognition service.

At step 1111, the processor may determine whether the current condition expires (or whether the condition information expires). When the current time is 9:05 in the morning, the processor may determine that the current condition has expired since the current time has exceeded the condition corresponding to time information, which is 7 to 9 a.m. Alternatively, when the current location is "Suwon-si, Gyeonggi-do", the processor may determine that the current condition has expired since the current location falls outside of the condition corresponding to location information, which is "Gangnam-gu, Seoul".

The processor may perform step 1113 when the current condition expires (e.g., "Yes" at step 1111), and may return to step 1105 when the current condition has not expired (e.g., "No" at step 1111). When returning to step 1105, the processor may continuously provide the voice recognition service through the main wake word or the user wake word while the current condition corresponds to the preset condition.

At step 1113, the processor may disable at least one user wake word corresponding to the current condition. The processor may disable user wake words (e.g., "bus", "subway", "route map", and "schedule") corresponding to time information (e.g., 7 to 9 a.m.) stored in the memory. When the voice is detected according to the user's speech, the processor may provide the voice recognition service according to whether the detected voice includes the main wake word.

Figure 12A:
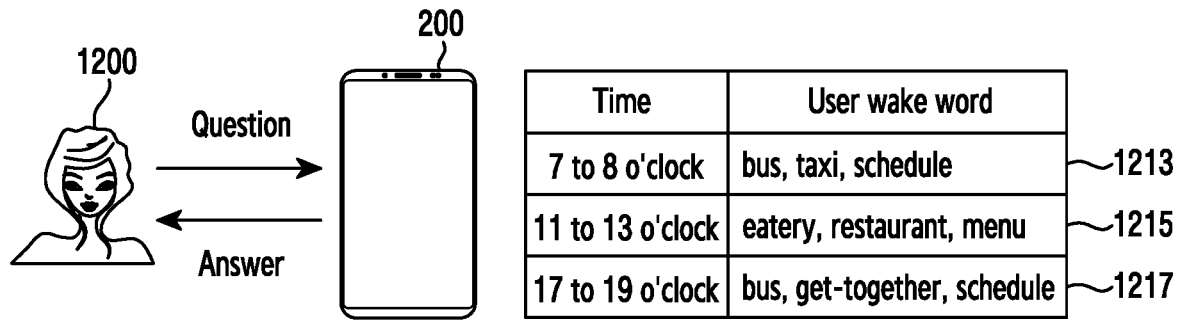
FIGS. 12A and 12B are diagrams of controlling a user wake word based on a current condition, according to an embodiment.
Figure 12A:
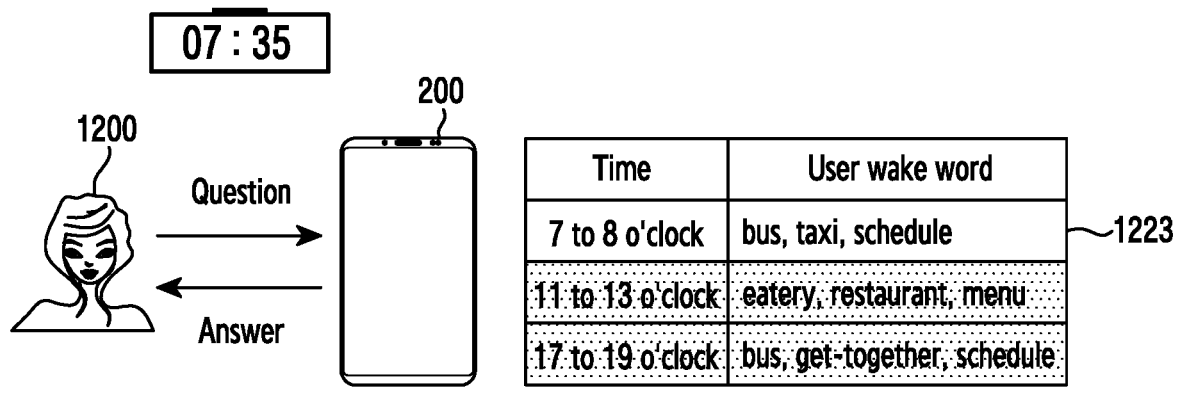
Figure 12A:
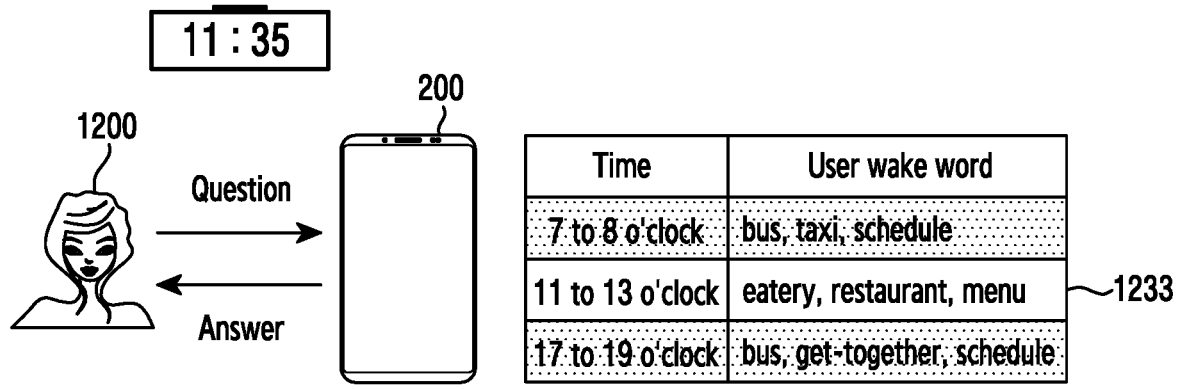
Figure 12B:
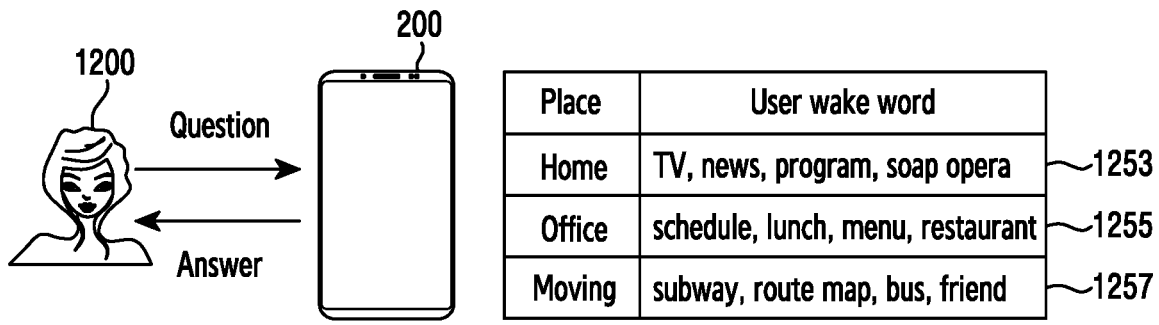
Figure 12B:
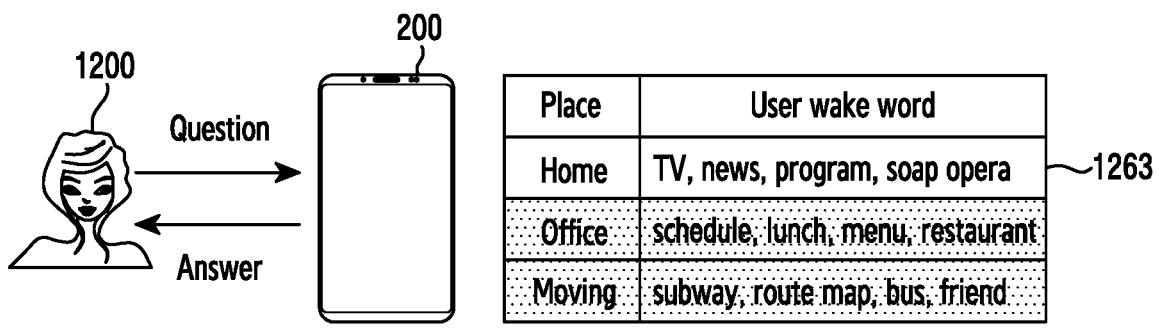
Figure 12B:
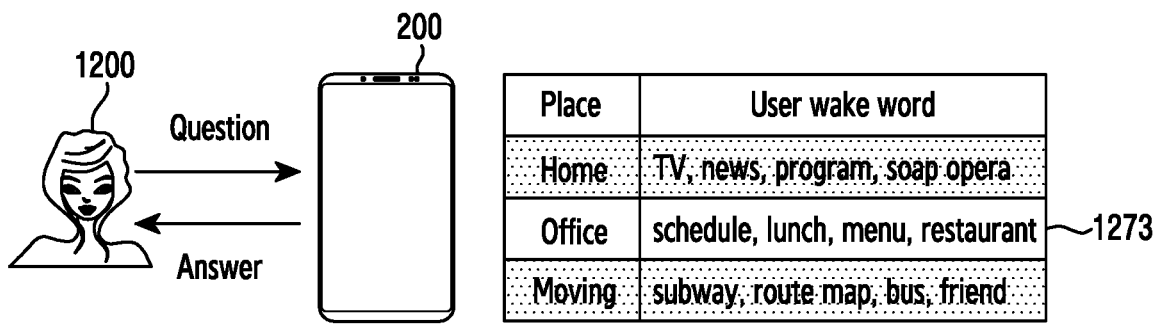

FIGS. 12A and 12B are diagrams of controlling a user wake word based on a current condition, according to an embodiment.

FIG. 12A illustrates an example of controlling the user wake word according to time condition information.

Referring to FIG. 12A, a first situation 1210 corresponds to an example of storing user wake words 1213, 1215, and 1217 in the memory of the electronic device 200. The electronic device 200 may store the user wake words 1213, 1215, and 1217 corresponding to time information in the memory. The first user wake word 1213 may be enabled when the time condition information corresponds to first time condition information (e.g., 7 to 8 a.m.). The second user wake word 1215 may be enabled when the time condition information corresponds to second time condition information (e.g., 11 a.m. to 1 p.m.). The third user wake word 1217 may be enabled when the time condition information corresponds to third time condition information (e.g., 5 to 7 p.m.). In the first situation 1210, the electronic device 200 may provide the voice recognition service when the speech of the user 1200 includes the main wake word.

The second situation 1220 corresponds to an example of enabling the user wake word according to a current time condition. When the current time is "07:35", the electronic device 200 may enable a first user wake word 1223 corresponding to first time condition information (e.g., 7 to 8 a.m.). When the speech of the user 1200 includes the main wake word or the first user wake word 1223, the electronic device 200 may provide the voice recognition service. The electronic device 200 may disable the second user wake word 1215 corresponding to second time condition information (e.g., 11 a.m. to 1 p.m.) and the third user wake word 1217 corresponding to third time condition information (e.g., 5 to 7 p.m.).

The third situation 1230 corresponds to another example of enabling the user wake word according to the current time condition. When the current time is "11:35", the electronic device 200 may enable a second user wake word 1233 corresponding to second time condition information (e.g., 11 a.m. to 1 p.m.). When the speech of the user 1200 includes the main wake word or the second user wake word 1233, the electronic device 200 may provide the voice recognition service. The electronic device 200 may disable the first user wake word 1213 corresponding to first time condition information (e.g., 7 to 8 a.m.) and the third user wake word 1217 corresponding to third time condition information (e.g., 5 to 7 p.m.).

FIG. 12B illustrates an example of controlling the user wake word according to location condition information.

Referring to FIG. 12B, a fourth situation 1250 corresponds to an example of storing user wake words 1253, 1255, and 1257 in the memory of the electronic device 200. The electronic device 200 may store the user wake words 1253, 1255, and 1257 corresponding to location information in the memory. The first user wake word 1253 may be enabled when location condition information corresponds to first location condition information (e.g., home). The second user wake word 1255 may be enabled when location condition information corresponds to second location condition information (e.g., office). The third user wake word 1257 may be enabled when location condition information corresponds to third location condition information (e.g., moving). Although FIG. 12B illustrates that first location condition information to third location condition information are "home", "office", and moving", the first location condition information to the third location condition information may be location coordinate information (e.g., latitude and longitude) or area information (e.g., Nonhyeon-dong, Gangnam-gu, Seoul, and Jangan-gu, Suwon-si, Gyeonggi-do). The location information in the drawing is only for assisting in understanding of the present disclosure, and the present disclosure is not limited by the detailed description or the drawings. In the fourth situation 1250, the electronic device 200 may provide the voice recognition service when the speech of the user 1200 includes the main wake word.

The fifth situation 1260 corresponds to an example of enabling the user wake word according to the current location condition. The electronic device 200 may grasp the current location based on location information acquired in real time or periodically from the communication unit. When there is a slight location change or no location change according to the time for a predetermined time (e.g., 10 minutes or 30 minutes), the electronic device 200 may determine that the current location is "home" or "office". Alternatively, when there is a location change detected according to the time, the electronic device 200 may determine that the current location is "moving".

When the current location is "home" (e.g., Jangan-gu, Suwon-si, Gyeonggi-do), the electronic device 200 may enable a first user wake word 1263 corresponding to first location condition information (e.g., home). When the speech of the user 1200 includes the main wake word or the first user wake word 1263, the electronic device 200 may provide the voice recognition service. The electronic device 200 may disable the second user wake word 1255 corresponding to second location condition information (e.g., the office) and the third user wake word 1257 corresponding to third location condition information (e.g., moving).

The sixth situation 1270 corresponds to an example of enabling the user wake word according to the current location condition. When the current location is "office" (e.g., Nonhyeon-dong, Gangnam-gu, Seoul), the electronic device 200 may enable the second user wake word 1273 corresponding to second location condition information (e.g., office). When the speech of the user 1200 includes the main wake word or the second user wake word 1273, the electronic device 200 may provide the voice recognition service. The electronic device 200 may disable the first user wake word 1253 corresponding to first location condition information (e.g., home) and the third user wake word 1257 corresponding to third location condition information (e.g., moving).

When the current condition corresponds to both the time condition information and the location condition information, the processor of the electronic device 200 may assign priority to the location condition information and enable only the user wake word corresponding to the location condition information. Conversely, the processor may assign priority to the time condition information and enable only the user wake word corresponding to the time condition information. Alternatively, the processor may enable only the user wake word corresponding to both the location condition information and the time condition information. Alternatively, the processor may assign different weighted values to the location condition information and the time condition information based on a user's use history, enable all user wake words corresponding to condition information having a high weighted value (e.g., location condition information), and enable only a predetermined number of user wake words with respect to condition information having a low weighted value (e.g., time condition information). An operation of enabling the user wake word when condition information overlaps may be changed according to settings of the electronic device 200 or settings of the user. However, this is merely a problem of implementation of the electronic device 200, and the present disclosure is not limited by the detailed description and the drawings.

According to an embodiment, a method of operating an electronic device may include activating a voice recognition service in response to user input, processing a task for voice information input by the activated voice recognition service, registering at least one user wake word by analyzing the voice information; and activating the voice recognition service in response to detection of the at least one user wake word.

The operation of registering the at least one user wake word may include extracting text information from the voice information, acquiring at least one word from the text information, and registering the acquired word as the user wake word.

The method may further include detecting a voice in the state in which the voice recognition service is deactivated, determining whether the input voice includes a main wake word, and, when the input voice includes the main wake word, initializing the registered user wake word.

According to an embodiment, a computer-readable recording medium may include a program executing an operation of activating a voice recognition service in response to user input, an operation of processing a task for voice information input by the activated voice recognition service, an operation of registering at least one user wake word by analyzing the voice information, and an operation of activating the voice recognition service in response to detection of the at least one user wake word.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
a speaker;
a microphone;
a communication interface;
at least one processor electrically connected to the speaker, the microphone, and the communication interface; and
a memory electrically connected to the processor,
wherein the memory stores instructions, and the instructions are configured to cause the processor, when executed, to:
activate a voice recognition service in response receiving a specified user input, receive a voice command during activation of the voice recognition service;
provide a feedback for the voice command;
deactivate the voice recognition service after providing the feedback;
receive a voice signal distinct from the specified user input during deactivation of the voice recognition service,
in response to receiving the voice signal, identify whether at least a portion of the voice signal corresponds to a wake-up command that is obtained from the voice command, and
in response to identifying that the at least the portion of the voice signal corresponds to the wake-up command, activate the voice recognition service.

2. The electronic device of claim 1, wherein the instructions are further configured to cause the processor, when executed, to:
extract text information from the voice command,
acquire at least one word from the text information, and
register the acquired word as the wake-up command.

3. The electronic device of claim 2, wherein the instructions are further configured to cause the processor, when executed, to:
acquire at least one first word from the text information,
acquire at least one second word related to the at least one first word, and
register the at least one first word or the at least one second word as the wake-up command, and
wherein the at least one second word includes synonym words of the at least one first word.

4. The electronic device of claim 3, wherein the instructions are further configured to cause the processor, when executed, to:
acquire at least one third word based on the at least one first word and the at least one second word, and
register the at least one third word as the wake-up command.

5. The electronic device 1, wherein the instructions are further configured to cause the processor, when executed, to count an activation standby time after providing the feedback for the voice command, and when a voice is not detected during the activation standby time, deactivate the voice recognition service.

6. The electronic device of claim 1, wherein the instructions are further configured to cause the processor, when executed, to determine whether the voice signal includes the specified user input, and if the voice signal includes the specified user input, delete the obtained wake-up command.

7. The electronic device of claim 1, wherein the instructions are further configured to cause the processor, when executed, to detect, by using a camera or a microphone of the electronic device, that a plurality of users is located within a predetermined area from the electronic device,
determine, based on the plurality of users, whether to enable or disable the wake-up command which is obtained from the voice command.

8. The electronic device of claim 7, wherein the instructions are further configured to cause the processor, when executed, to disable the wake-up command to activate the voice recognition service if the number of speakers is not equal to one.

9. The electronic device of claim 1, wherein the instructions are further configured to cause the processor, when executed, to determine whether a current condition corresponds to condition information, and when the current condition corresponds to the condition information, enable at least one wake-up command corresponding to the condition information.

10. The electronic device of claim 9, wherein the instructions are further configured to cause the processor, when executed, to determine whether the condition information expires, and when the condition information expires, disable at least one wake-up command corresponding to the condition information.

11. The electronic device of claim 1, wherein the specified user input includes at least one of a sound signal of a specified word, a specified touch, and a specified button.

12. The electronic device of claim 1, wherein the instructions are further configured to cause the processor, when executed, to display a user interface for controlling the wake-up command after providing of the feedback for the voice command.

13. The electronic device of claim 1, wherein the instructions are further configured to cause the processor, when executed, to control the voice recognition service using the wake-up command according to speaker identification while the voice recognition service is activated.

14. The electronic device of claim 1, wherein the at least one processor includes a first processor corresponding to a low power processor, and a second processor corresponding to a main processor, and
wherein the first processor is configured to receive the voice signal by controlling at least one of the speaker, the microphone, and the memory, while the second processor is in a sleep mode for deactivating the voice recognition service.

15. An electronic device comprising:
a speaker;
a microphone;
a communication interface;
at least one processor electrically connected to the speaker, the microphone, or the communication interface; and
a memory electrically connected to the at least one processor,
wherein the memory stores instructions, and the instructions are configured to cause the processor, when executed, to:
receive at least one main wake word through the microphone,
in response to the received main wake word, activate a voice recognition function provided from an external server or implemented in the electronic device,
receive a user's speech including at least one user wake word through the microphone, and
activate the voice recognition function in response to the received user wake word without the main wake word.

16. The electronic device of claim 15, wherein the at least one main wake word includes a name or a title related to the electronic device.

17. The electronic device of claim 15, wherein the at least one user wake word includes a name or a title selected by a user.

18. The electronic device of claim 15, wherein the instructions are further configured to cause the processor, when executed, to activate the voice recognition function in response to the received user wake word only during a set time period.

19. The electronic device of claim 15, wherein the at least one processor includes a first processor corresponding to a low power processor, and a second processor corresponding to a main processor, and
wherein the first processor is configured to receive the voice signal by controlling at least one of the speaker, the microphone, and the memory, while the second processor is in a sleep mode for deactivating the voice recognition service.

20. An electronic device comprising:
a speaker;
a microphone;
a communication interface;
a processor electrically connected to the speaker, the microphone, or the communication interface; and
a memory electrically connected to the processor,
wherein the memory stores instructions, and the instructions are configured to cause the processor, when executed, to:
in response to receiving in a state disabling a voice recognition service, a first voice signal that is distinct from a specified user input for enabling a voice recognition service and that corresponds to a voice command that has been previously received after reception of the specified user input, enable the voice recognition service; and
in response to receiving, in the state disabling the voice recognition service, a second voice signal that is distinct from the specified user input for enabling the voice recognition service and distinct from the voice command that has been previously received after reception of the specified user input, maintain to disable the voice recognition service.

* * * * *